US011225026B2

(12) United States Patent
Georgeson et al.

(10) Patent No.: US 11,225,026 B2
(45) Date of Patent: Jan. 18, 2022

(54) BEAD-TYPE ADDITIVE MANUFACTURING SYSTEM AND METHOD

(71) Applicant: The Boeing Company, Chicago, IL (US)

(72) Inventors: Gary E. Georgeson, Tacoma, WA (US); Bharath K. Kodumuru, Bangalore (IN); Hong H. Tat, Redmond, WA (US); Edward J. Kang, Renton, WA (US); Nathan J. Chapdelaine, Renton, WA (US); Thomas A. Maeder, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 16/422,356

(22) Filed: May 24, 2019

(65) Prior Publication Data

US 2020/0368970 A1  Nov. 26, 2020

(51) Int. Cl.
*B29C 64/393* (2017.01)
*B33Y 10/00* (2015.01)
*B33Y 30/00* (2015.01)
*B33Y 50/02* (2015.01)
*B29C 64/118* (2017.01)
(Continued)

(52) U.S. Cl.
CPC .......... *B29C 64/393* (2017.08); *B22D 23/003* (2013.01); *B29C 64/118* (2017.08); *B29C 64/209* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| 10,254,499 | B1 * | 4/2019 | Cohen | ...................... B23K 1/19 |
| 2015/0328839 | A1 | 11/2015 | Willis | |
| 2015/0331402 | A1 | 11/2015 | Lin | |

(Continued)

OTHER PUBLICATIONS

Wikipedia, "3D Printing Processes," retrieved on May 9, 2019.
(Continued)

*Primary Examiner* — Matthew J Daniels
*Assistant Examiner* — Andrew L Swanson

(57) ABSTRACT

A manufacturing system includes a printhead, at least one profilometer, and a control system. The printhead extrudes a material onto a substrate and forms a new bead during additive manufacturing of an in-work article. The profilometer moves with the printhead and measures an in-work cross-sectional profile of existing beads of the in-work article. The control system generates in-work profile data including the in-work cross-sectional profile at a plurality of in-work profile locations, and continuously compares the in-work profile data to reference profile data of a reference article. The reference profile data includes a reference cross-sectional profile at a plurality of reference profile locations. The control system adjusts, based on the profile comparison, one or more bead forming parameters and causes the printhead to form the new bead according to the bead forming parameters to reduce or prevent nonconformities associated with forming the new bead.

22 Claims, 17 Drawing Sheets

(51) Int. Cl.
*B29C 64/209* (2017.01)
*B22D 23/00* (2006.01)

(56) References Cited

U.S. PATENT DOCUMENTS

| | | | | |
|---|---|---|---|---|
| 2016/0136896 A1* | 5/2016 | Wighton | ............... | B33Y 50/00 700/120 |
| 2016/0236414 A1* | 8/2016 | Reese | ................... | B33Y 50/02 |
| 2019/0077079 A1* | 3/2019 | Susnjara | ............... | B33Y 30/00 |
| 2019/0077081 A1 | 3/2019 | Susnjara | | |
| 2020/0368848 A1* | 11/2020 | Birmingham | ........ | B23K 26/702 |

OTHER PUBLICATIONS

Thermwood Corporation, News Release: "Thermwood Has Successfully Tested the "Ultra High Output" PH50 Print Head on the LSAM," Sep. 15, 2016.
Roth, et al, "3-D Surface Depression Profiling Using High Frequency Focused Air-Coupled Ultrasonic Pulses," NASA/TM-1999-209053, May 1999.
Keyence Corporation, Data Sheet: "High-Speed 2D/3D Laser Profiler" retrieved Feb. 20, 2019.
EPO, Eurpoean Search Report, Appl. No. 20163600.8, dated Aug. 31, 2020.

* cited by examiner

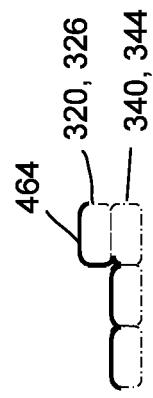
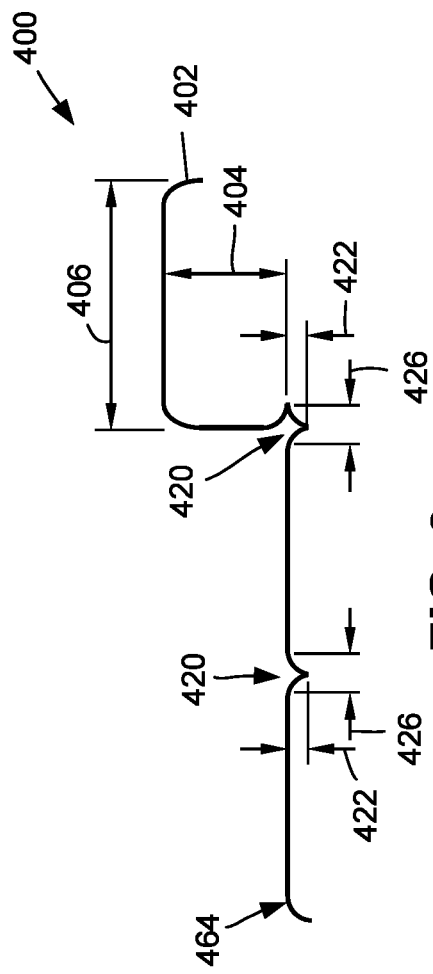
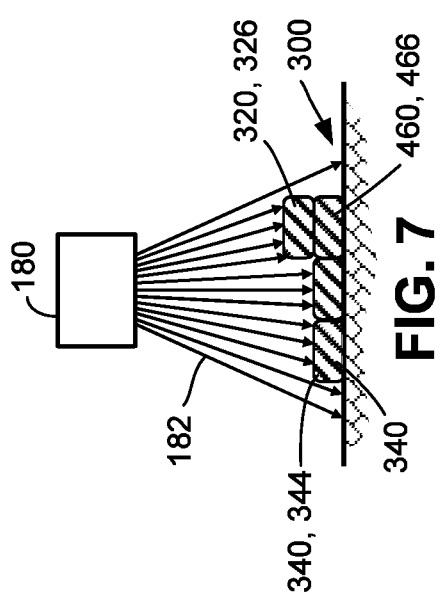

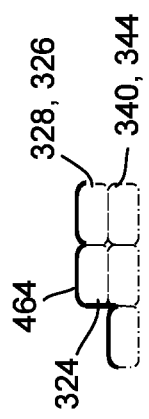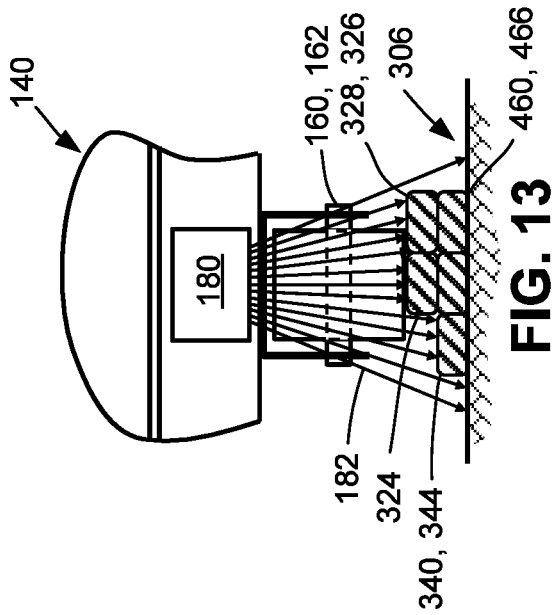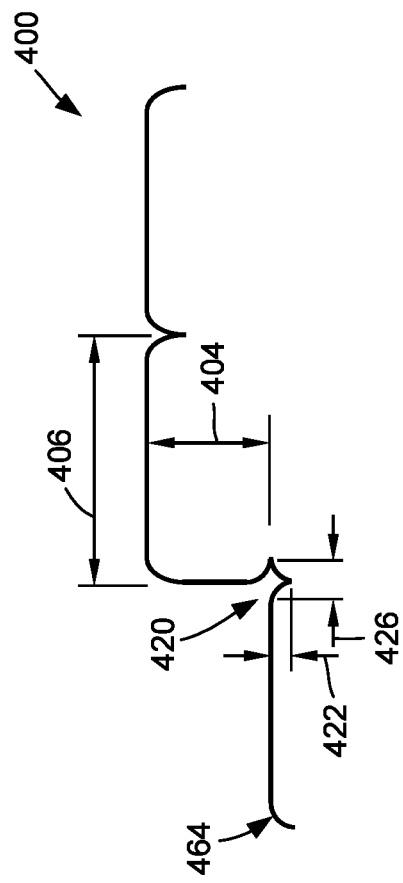

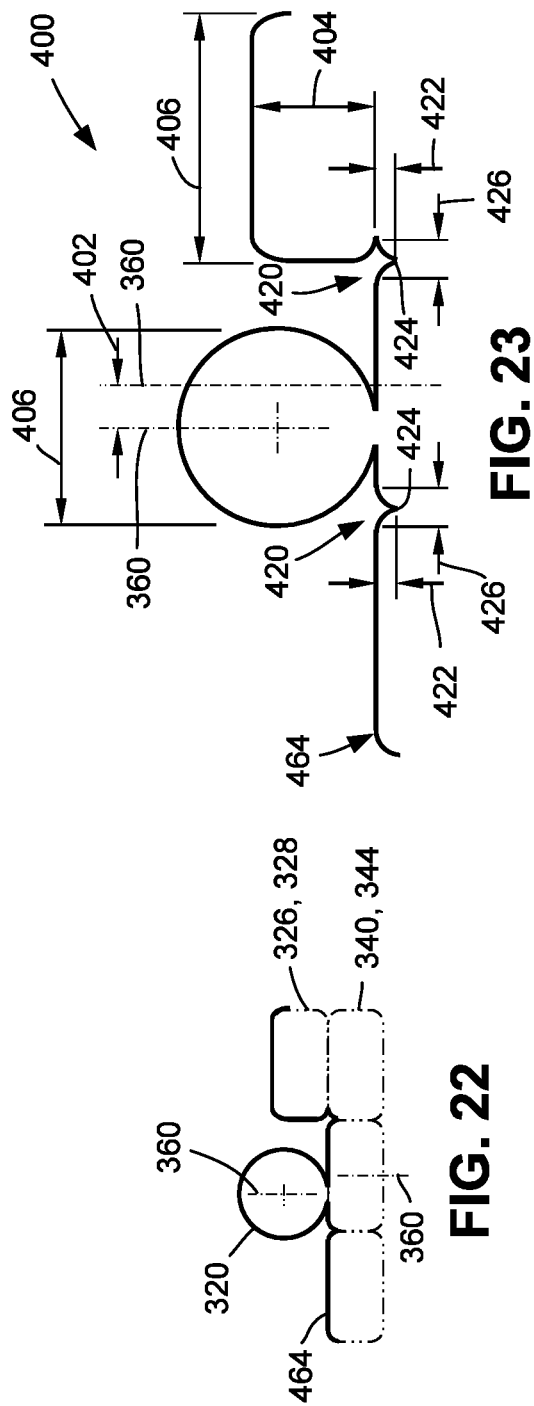

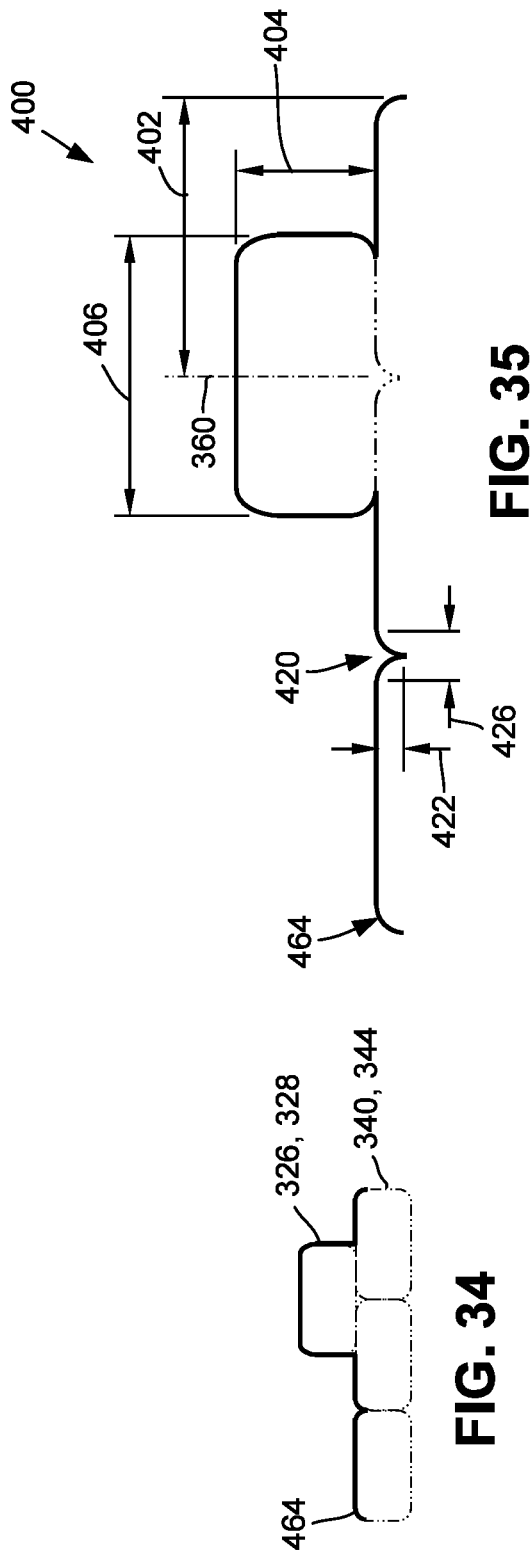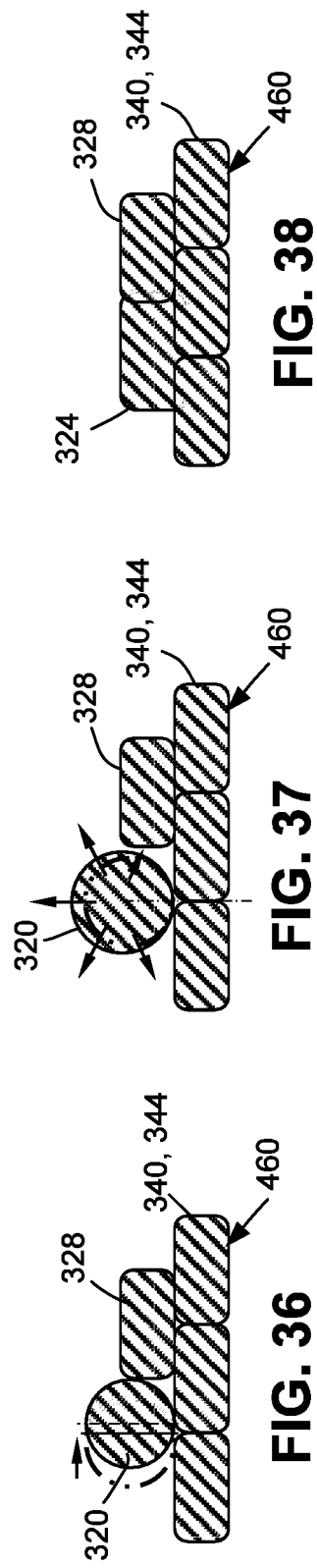

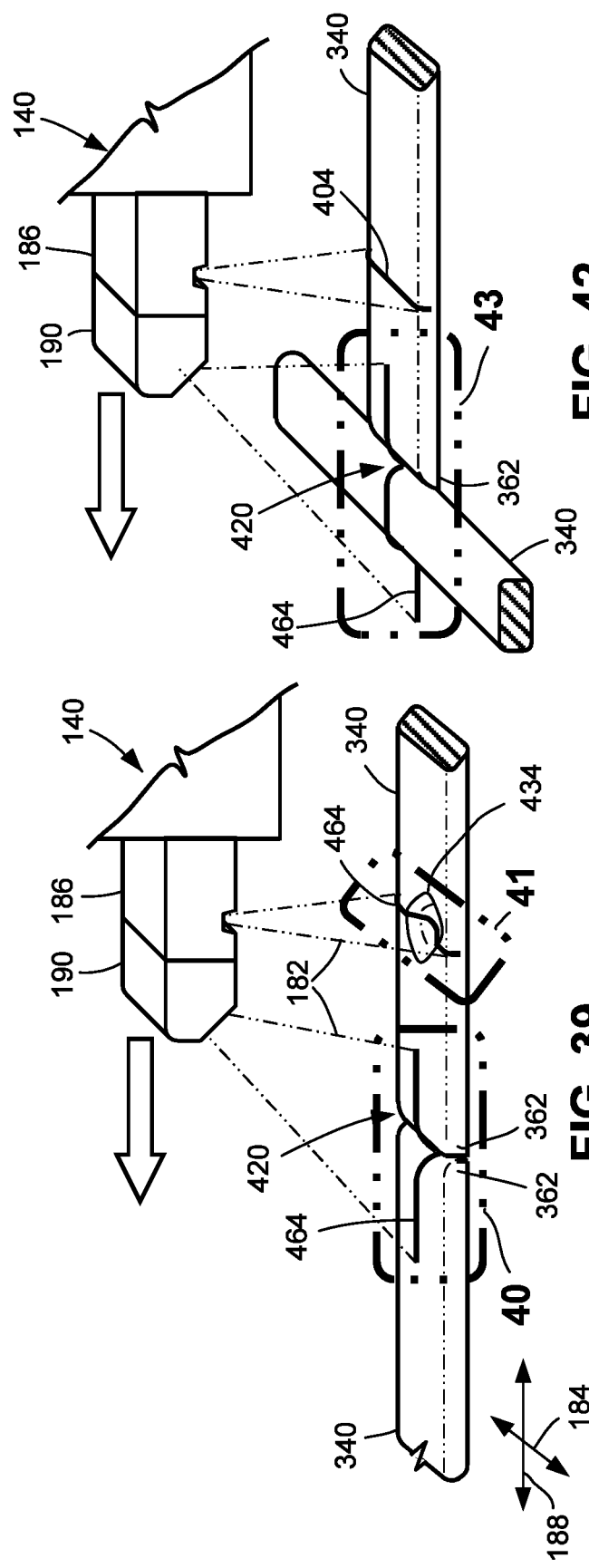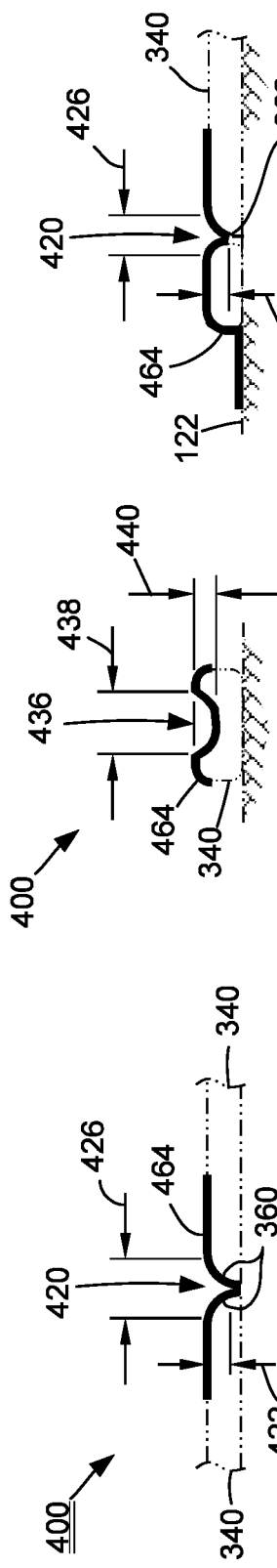

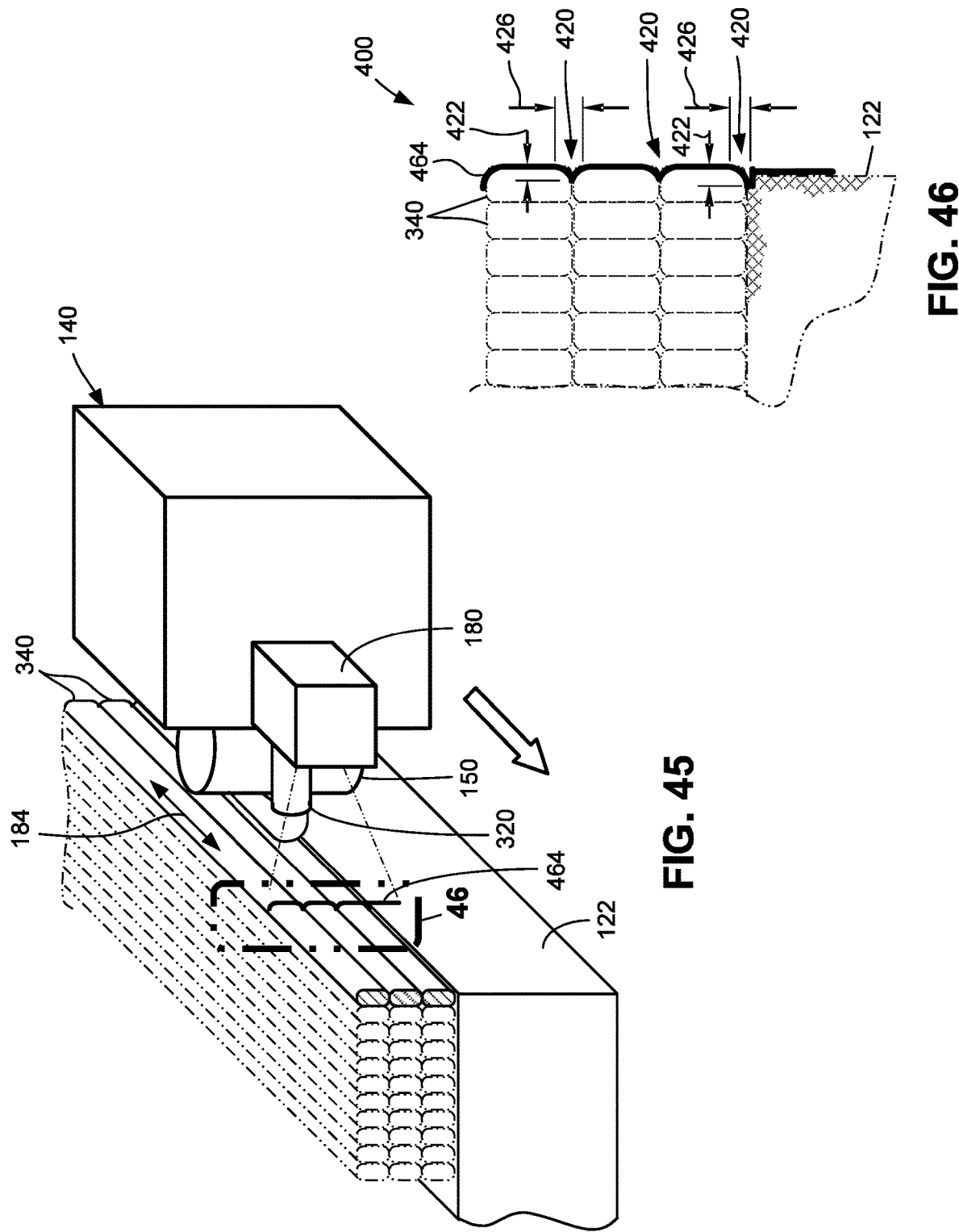

BEAD-TYPE ADDITIVE MANUFACTURING SYSTEM AND METHOD

FIELD

The present disclosure relates generally to manufacturing systems and, more particularly, to a system and method for additively manufacturing an article using profilometer feedback.

BACKGROUND

Additive manufacturing is a cost-effective method for manufacturing relatively small quantities of articles of relatively complex shape. For example, bead-type additive manufacturing provides a relatively quick method for manufacturing contoured layup tools for composite part fabrication. In bead-type additive manufacturing, a printhead moving over a substrate extrudes a bead of material onto a table or onto previously applied beads. The printhead applies beads in a layer-by-layer manner to build up the article.

As each new bead is extruded, the new bead may be partially flattened by a compression roller. Each flattened bead may preferably be in side-by-side contacting relation to an existing bead in the same layer. In addition, the terminal ends of each flattened bead are preferably in contacting relation to another bead or the same bead in the same layer. However, in certain instances, surface variations such as notches or gaps may occur between the new bead and one or more existing beads. Such notches or gaps may result in flaws such as voids which may compromise the structural integrity of the finished article. Currently, finished articles must be examined after completion to determine the extent of nonconformities such as voids in the article, and to assess and revise the bead forming parameters in an iterative manner to reduce or prevent the occurrence of such flaws or voids during future manufacturing of the article. Unfortunately, such an evaluation process is time-consuming, labor intensive, and costly.

As can be seen, there exists a need in the art for a system and method for bead-type additive manufacturing that avoids the need for iterative adjustment of the bead forming parameters to reduce or prevent nonconformities in a finished article.

SUMMARY

The above-noted needs associated with bead-type additive manufacturing are specifically addressed and alleviated by the present disclosure which provides a manufacturing system having a printhead, at least one profilometer, and a control system. The printhead is configured to extrude a material onto a substrate and form a new bead during additive manufacturing of an in-work article. The profilometer is movable with the printhead and is configured to measure an in-work cross-sectional profile at least of one or more existing beads of the in-work article during forming of the new bead. The control system is configured to generate in-work profile data including the in-work cross-sectional profile at a plurality of in-work profile locations in the in-work article, and continuously perform a profile comparison of the in-work profile data to reference profile data of a reference article. The reference profile data includes a reference cross-sectional profile at a plurality of reference profile locations corresponding to the plurality of in-work profile locations. The control system is additionally configured to adjust, based on the profile comparison, one or more bead forming parameters and cause the printhead to form the new bead according to the bead forming parameters in a manner resulting in a reduction in a size of a nonconformity associated with forming the new bead relative to the size of the nonconformity otherwise occurring without adjusting the bead forming parameters.

Also disclosed is a method of manufacturing an in-work article. The method includes extruding, using a printhead of an additive manufacturing system, a material onto a substrate to form a new bead during manufacturing of the in-work article. The method additionally includes measuring, using at least one profilometer movable with the printhead, an in-work cross-sectional profile at least of one or more existing beads of the in-work article during forming of the new bead. The method also includes generating, using a control system, in-work profile data including the in-work cross-sectional profile at a plurality of in-work profile locations in the in-work article. In addition, the method includes comparing, using the control system, the in-work profile data to reference profile data of a reference article. The reference profile data includes a reference cross-sectional profile at a plurality of reference profile locations corresponding to the plurality of in-work profile locations. The method further includes adjusting, based on comparing the in-work profile data to the reference profile data, one or more bead forming parameters causing a reduction in a size of a nonconformity associated with forming the new bead relative to the size of the nonconformity otherwise occurring without adjusting the bead forming parameters.

Also disclosed is a method of manufacturing an in work article in which the method includes evaluating a physical example of a nominal article representative of at least a portion of the in-work article, and generating nominal profile data containing a nominal cross-sectional profile and associated voids at one or more of a plurality of nominal profile locations in the nominal article. The method additionally includes extruding, using a printhead of an additive manufacturing system, a polymeric material onto a substrate to form a new bead during manufacturing of the in-work article, and measuring, using at least one profilometer movable with the printhead, an in-work cross-sectional profile at least of one or more existing beads of the in-work article during forming of the new bead. The method also includes generating, using a control system, in-work profile data including the in-work cross-sectional profile at a plurality of in-work profile locations in the in-work article. In addition, the method includes comparing, using the control system, the in-work profile data to the nominal profile data. Additionally, the method includes adjusting, based on comparing the in-work profile data to the nominal profile data, one or more bead forming parameters causing a reduction in a size of a nonconformity associated with forming the new bead relative to the size of the nonconformity otherwise occurring without adjusting the bead forming parameters.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 7 is a partial sectional view of the printhead taken along line 7-7 of FIG. 4 and illustrating a profilometer measuring an in-work cross-sectional profile of existing beads at the pre-laydown location;

FIG. 8 shows an example of an in-work cross-sectional profile taken at the pre-laydown location;

FIG. 9 is a magnified view of the in-work cross-sectional profile of FIG. 8 and showing the profile features;

FIG. 13 is a partial sectional view of the printhead taken along line 13-13 of FIG. 4 and illustrating the profilometer measuring an in-work cross-sectional profile of existing beads and a new bead at the post-flattened location;

FIG. 14 shows an example of an in-work cross-sectional profile taken at the post-flattened location;

FIG. 15 is a magnified view of the in-work cross-sectional profile of FIG. 14 and showing the profile features;

FIG. 22 shows an example of an in-work cross-sectional profile of the existing beads and pre-flattened bead of FIG. 16;

FIG. 23 is a magnified view of the in-work cross-sectional profile of FIG. 22 and illustrating one or more profile features (e.g., bead size, notch size, etc.) of the in-work cross-sectional profile;

FIG. 24 is a cross-sectional view of the existing beads and pre-flattened bead of FIG. 16 showing the positioning of the pre-flattened bead;

FIG. 25 is a cross-sectional view of the bead configuration of FIG. 24 after the flattening of the pre-flattened bead to form the new bead;

FIG. 34 shows an example of an in-work cross-sectional profile of existing beads in which the adjacent bead may be mislocated;

FIG. 35 is a magnified view of the in-work cross-sectional profile of FIG. 34 and illustrating one or more of the profile features that the control system may compare with corresponding profile features of a reference article;

FIG. 36 is a cross-sectional view of the existing beads of FIG. 34 and showing the pre-flattened bead positioned nearer to the adjacent bead;

FIG. 37 is a cross-sectional view of the existing beads of FIG. 34 and showing the pre-flattened bead at an increased size as a result of adjusting one or more bead forming parameters;

FIG. 38 is a cross-sectional view of the bead configurations of FIGS. 36-37 after the flattening of the pre-flattened bead;

FIG. 39 is a perspective view of an example of a portion of a printhead of FIG. 4 shown approaching the opposing terminating ends of existing beads and showing a lateral profilometer and a longitudinal profilometer measuring an in-work cross-sectional profile respectively along a lateral direction and a longitudinal direction;

FIG. 40 is a magnified view of the portion of the existing beads identified by reference numeral 40 of FIG. 39;

FIG. 41 is a magnified view of the portion of the existing bead identified by reference numeral 41 of FIG. 39;

FIG. 42 is a perspective view of an example of a portion of a printhead approaching an intersection of an existing bead with another existing bead;

FIG. 43 is a magnified view of the portion of the existing beads identified by reference numeral 43 of FIG. 42 and showing the in-work cross-sectional profile taken along the longitudinal direction of travel of the printhead;

FIG. 45 is a perspective view of the printhead and a portion of the existing beads and tool of FIG. 45 and illustrating a profilometer measuring the in-work cross-sectional profile of the existing beads;

FIG. 46 is a magnified sectional view of the portion of the existing beads and tool of FIG. 45 and illustrating profile features of the in-work cross-sectional profile;

DETAILED DESCRIPTION

Figure 1:
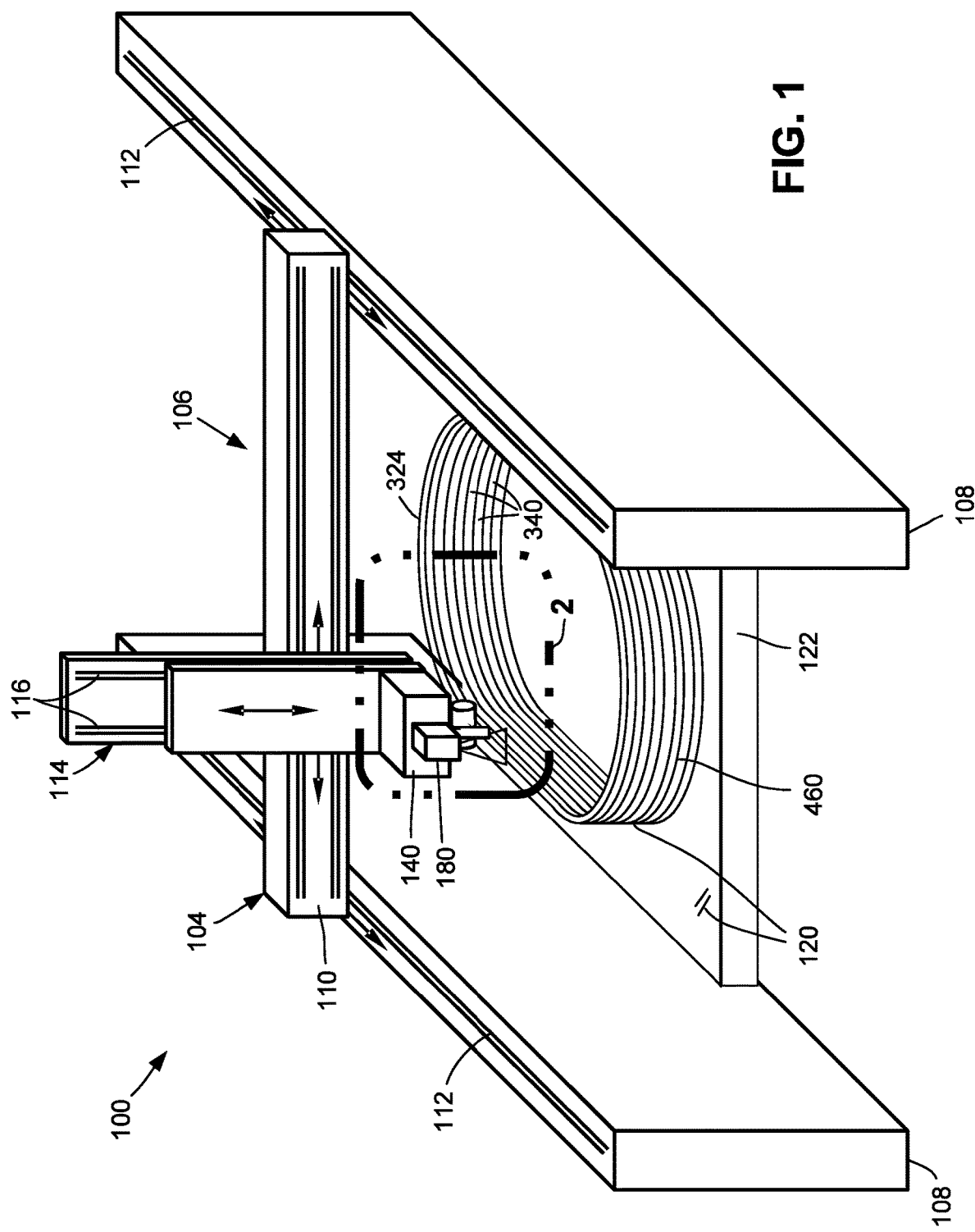
FIG. 1 is a perspective view of an example of a presently-disclosed manufacturing system including an additive manufacturing machine having a printhead configured for additively manufacturing an in-work article supported on a table for layer-by-layer manufacturing in a vertical direction.

Referring now to the drawings which illustrate various examples of the disclosure, shown in FIG. 1 is a perspective view of an example of a manufacturing system 100 including an additive manufacturing machine 102 having a printhead 140 configured for layer-by-layer manufacturing of an in-work article 460. In the example of FIG. 1, the in-work article 460 is supported on a table 122, and the printhead 140 is oriented for layer-by-layer manufacturing of the in-work article 460 in a vertical direction. However, in other examples (FIG. 41) of the additive manufacturing machine 102 described below, the printhead 140 may be oriented for layer-by-layer manufacturing of the in-work article 460 in a horizontal direction or in other directions.

Figure 2:
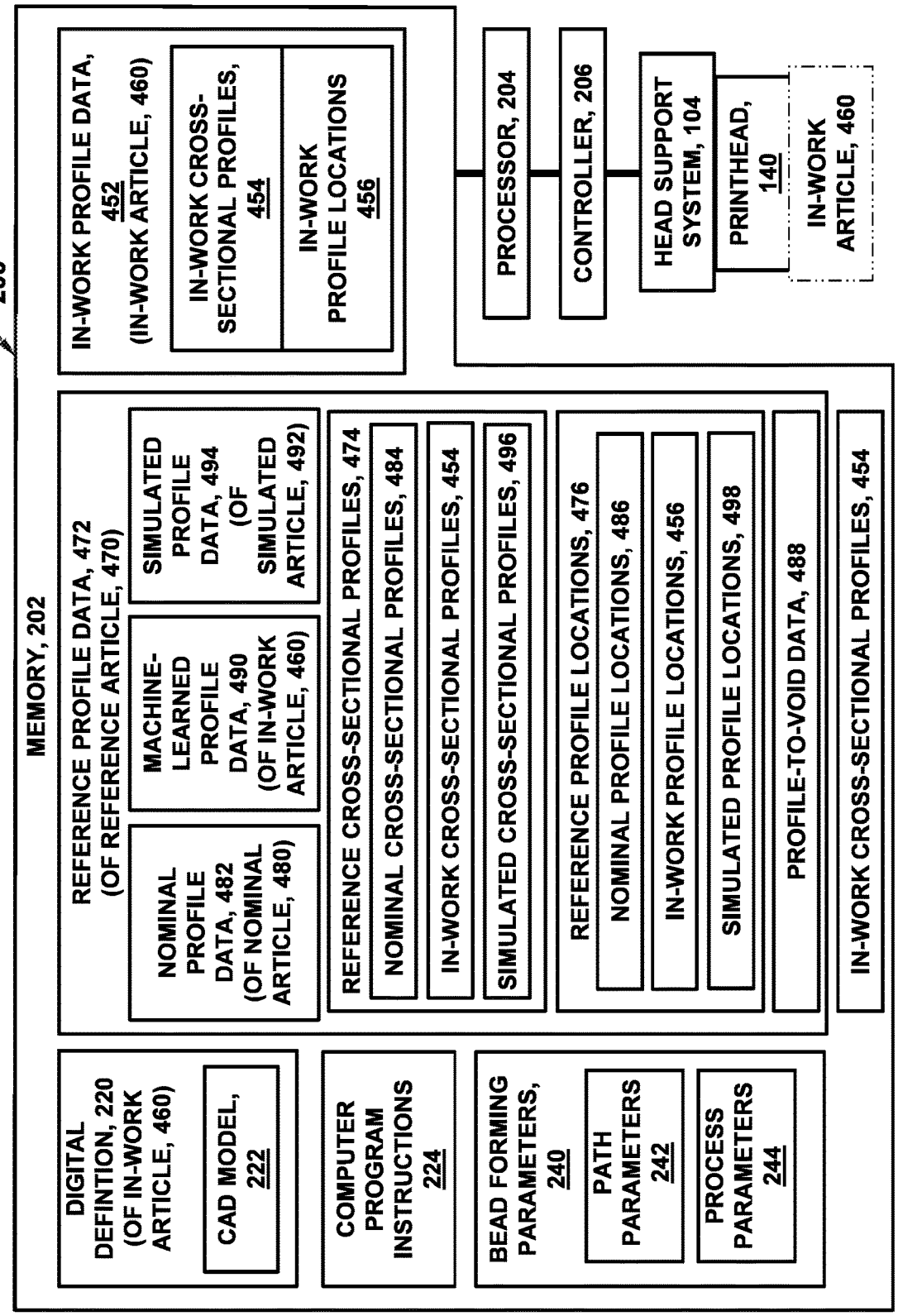
FIG. 2 is a block diagram of an example of a control system of the manufacturing system.

In FIGS. 1-2, the printhead 140 is configured to extrude a material onto a substrate 120 and form a new bead 324 during relative movement of the printhead 140 for additive manufacturing of the in-work article 460. The manufacturing system 100 further includes at least one profilometer 180 movable with the printhead 140 and configured to continuously or periodically measure an in-work cross-sectional profile 464 (FIG. 3) at least of one or more existing beads 340 of the in-work article 460 during forming of the new bead 324. The manufacturing system 100 additionally includes a control system 200 (FIG. 2) having a processor 204 (FIG. 2) configured to continuously or periodically generate and record in-work profile data 462 (FIG. 2) including the in-work cross-sectional profiles 464 measured by the profilometer 180 at a corresponding plurality of in-work profile locations 466 in the in-work article 460. The in-work profile locations 466 of the in-work cross-sectional profiles 464 may be continuously determined and/or automatically recorded in a memory 202 (FIG. 2) and may be based on the six-dimensional locational data of the printhead 140 at the time of measurement of the in-work cross-sectional profile 464 by a profilometer 180. The six-dimensional locational data of the printhead 140 may include three-dimensional position data (e.g., the x, y, z location of the printhead 140) and three-dimensional angular orientation data (e.g., orientation of the printhead 140 about each of the x, y, and z axes).

Referring to FIG. 2, the control system 200 is additionally configured to continuously or periodically perform a profile comparison of the in-work profile data 462 to reference profile data 472 of a reference article 470. The reference profile data 472 includes a reference cross-sectional profile 474 at a plurality of reference profile locations 476. The plurality of reference profile locations 476 in the reference article 470 correspond to the plurality of in-work profile locations 466 in the in-work article 460. In one example described below, the reference profile data 472 may include nominal profile data 482 containing a plurality of reference cross-sectional profiles 474 at a corresponding plurality of nominal profile locations 486 of a nominal article 480 which may represent the as-designed configuration of the in-work article 460. The nominal profile data 482 may include profile-to-void data 488 identifying voids 442 (e.g., FIGS. 6, 14, 21, 25, 29, 33) existing at or associated with one or more of the nominal profile locations 486 (FIG. 2) in the reference article 470.

In another example described below, the reference profile data 472 may include simulated profile data 494 of a simulated article 492 that may represent the in-work article 460. For example, the simulated article 492 may be a computer model (e.g., a three-dimensional digital definition 220) of the in-work article 460. The simulated profile data 494 may include a plurality of simulated cross-sectional profiles 496 at a corresponding plurality of simulated profile locations 498 and may additionally include profile-to-void data 488 identifying voids 442 in the simulated article 492 at one or more of the simulated profile locations 498. The simulated cross-sectional profile 496 may be generated by analysis or querying of the simulated article 492 regarding profile features 400 of simulated cross-sectional profiles 496 at a plurality of simulated profile locations 498 in the simulated article 492. The control system 200 may adjust, based on the profile comparison, one or more bead forming parameters 240 in a manner reducing a nonconformity 430 in the in-work article 460 to a size no larger than the nonconformity 430 at a corresponding one or more of the simulated profile locations 498 in the simulated article 492. In a still further example also described below, the reference profile data 472 may include machine-learned profile data 490 which may contain a plurality of in-work cross-sectional profiles 464 previously measured by the profilometer 180 for use by the control system 200 to predict and mitigate nonconformities 430 in the in-work article 460.

As described in greater detail below, the control system 200 (FIG. 2) is configured to adjust (e.g., via a controller 206), based on the profile comparison, one or more bead forming parameters 240, and cause the printhead 140 to form the new bead 324 according to the bead forming parameters 240 in a manner resulting in a reduction in a size of a nonconformity 430 (e.g., FIGS. 17, 19, 21, 23, 27, 31, etc.) associated with forming the new bead 324 at one or more of the in-work profile locations 466 relative to the size of the nonconformity 430 otherwise occurring without adjusting the bead forming parameters 240. In this regard, adjustment of the one or more bead forming parameters 240 may be performed on an as-needed basis, such as when the in-work cross-sectional profile 464 deviates from the reference cross-sectional profile 474 to an extent that the control system 200 determines that a nonconformity 430 exceeding a predetermined size will occur in the in-work article 460 absent adjustment of the bead forming parameters 240. As described in greater detail below, a nonconformity 430 in the in-work article 460 may include a gap 432 (e.g., FIGS. 17 and 19) between a new bead 324 and an existing bead 340, a notch 420 (e.g., FIG. 21) exceeding a threshold notch size (e.g., 0.10 inch) between existing beads 340, a bead mislocation 434 (e.g., FIG. 16), an existing bead 340 that is a mis-sized bead 408 (e.g., FIGS. 18 and 20), and/or a void 442 (e.g., FIG. 21) exceeding a threshold size (e.g., 0.10 inch).

Referring to FIG. 1, the printhead 140 may be movably supported by a head moving system 104 configured to move the printhead 140 relative to the substrate 120 (e.g., table 122) during additive manufacturing of the in-work article 460. In the example shown, the head moving system 104 may be configured as a gantry 106 having a horizontal beam 110 that may be movable along horizontal tracks 112 or rails respectively of a pair of base members 108 which may be supported on a factory floor. The head moving system 104 may include a vertical beam 114 to which the printhead 140 may be coupled. The vertical beam 114 may include vertical tracks 116 or rails for vertical movement of the printhead 140. The gantry 106 may enable movement of the printhead 140 along three mutually perpendicular axes according to a preprogrammed head path for manufacturing the in-work article 460. In another example not shown, the head moving system 104 may be configured as a robotic device having a robotic arm configured to move the printhead 140 along a preprogrammed head path.

As shown in FIG. 2, the control system 200 may include a controller 206 configured to control the head moving system 104 for controlling movement (e.g., path parameters 242—the head path, the head travel speed, the head orientation) of the printhead 140 according to computer readable program instructions 224 based on a three-dimensional digital definition 220 (e.g., a computer-aided-design (CAD) model 222) of the in-work article 460. The computer-aided-design (CAD) model 222 may also function as the simulated article 492 from which the simulated profile data 494 is generated for comparison to the in-work profile data 452 during manufacturing of an in-work article 460. In addition to controlling movement of the printhead 140, the control system 200 may be configured to control the operation (e.g., process parameters 244) of the printhead 140 in forming the new bead 324 based on the computer readable program instructions 224. At the completion of the layer-by-layer manufacturing, the in-work article 460 may have a net shape or a near-net shape that may be trimmed, machined and/or otherwise processed into a final shape.

Figure 3:
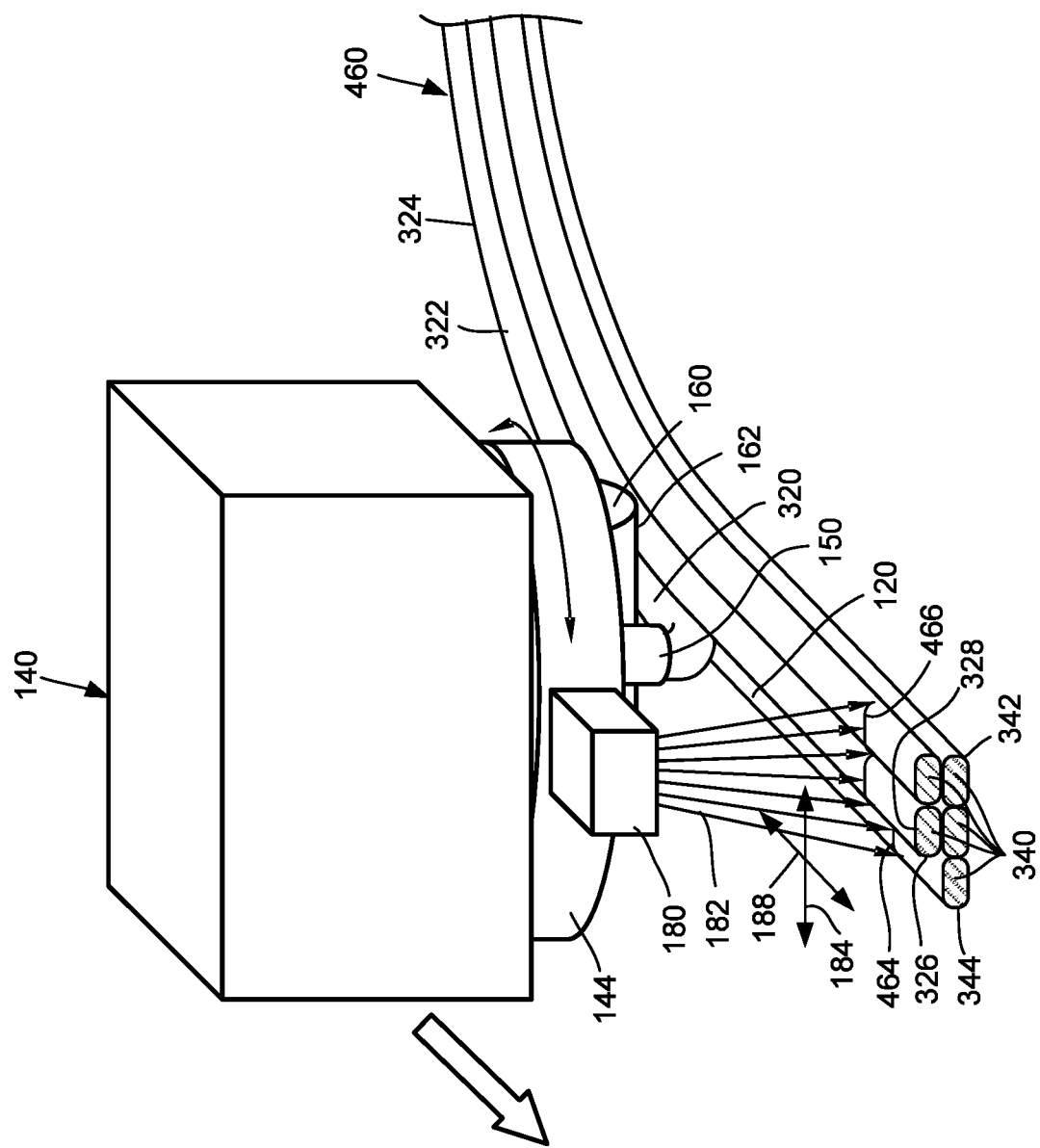
FIG. 3 is a perspective view of an example of a printhead having a nozzle and a compression device for flattening material extruded by the nozzle for forming a new bead and further including a profilometer configured to measure an in-work cross-sectional profile of one or more existing beads of the in-work article during forming the new bead.
Figure 4:
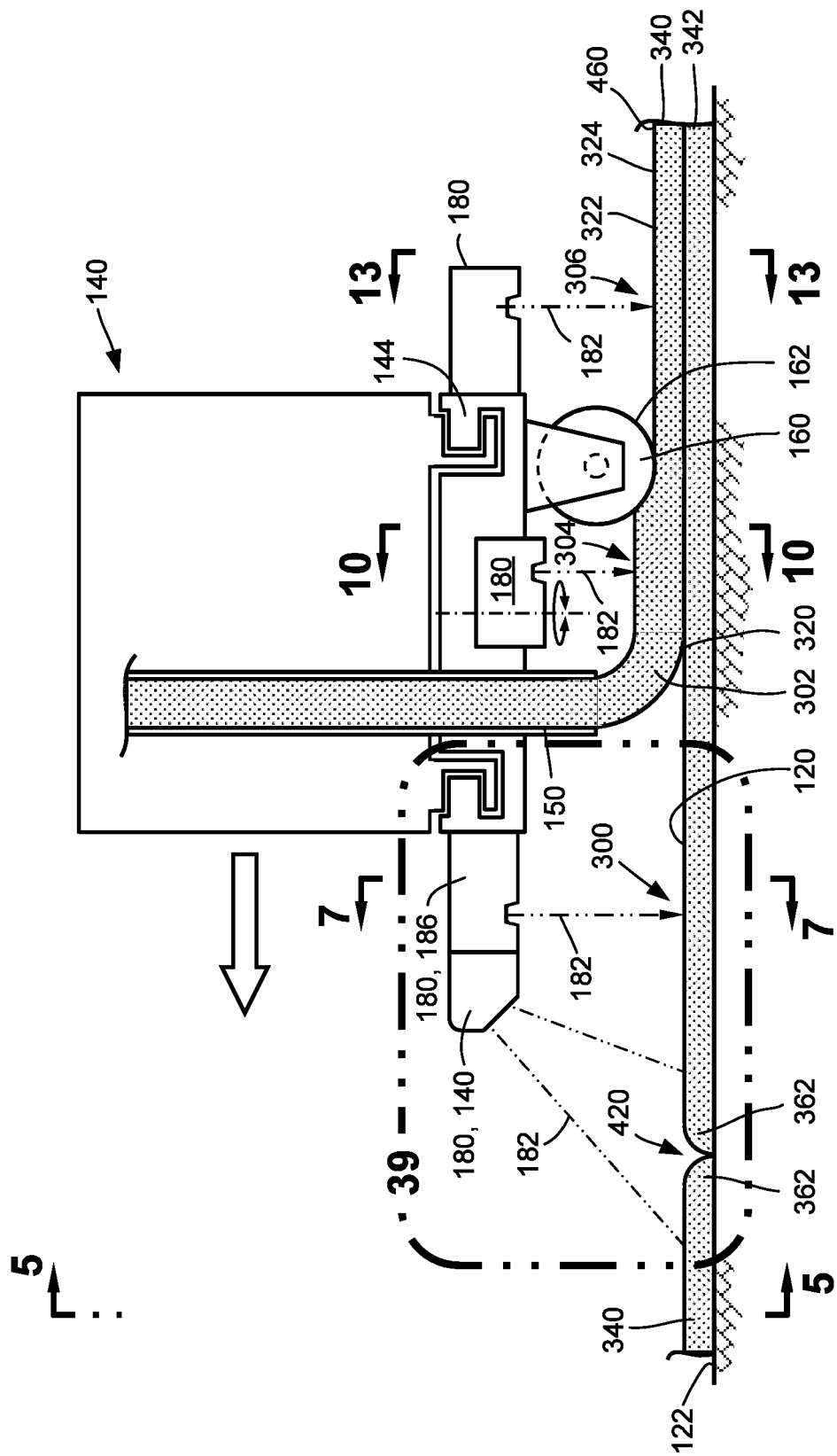
FIG. 4 is a side sectional view of an example of a printhead having a profilometer mounted to the printhead at several locations including a pre-laydown location upstream of the nozzle, a pre-flattened location between the nozzle and the compression device, and a post-flattened location downstream of the compression device.

Referring to FIGS. 3-4, shown is an example of a printhead 140 forming a new bead 324 of material on top of a beneath layer 344 of existing beads 340, and next to an adjacent bead 328 of a new layer 326. In the present disclosure, a beneath layer 344 may be described as an existing layer 342 containing one or more existing beads 340 upon which the new bead 324 is formed. An adjacent bead 328 may be described as an existing bead 340 alongside of which the new bead 324 is to be formed in the new layer 326. FIG. 4 is a sectional view of the printhead 140 of FIG. 3 showing the printhead 140 forming a new bead 324 on top of an existing layer 342 of existing beads 340. Also shown in FIG. 4 are the terminating ends 362 of the existing layer 342 upon which the new bead 324 is being formed.

The printhead 140 may include at least one nozzle 150 for extruding material, and may also include a compression device 160 for at least partially flattening the material after extrusion. The nozzle 150 may extrude a pre-flattened bead 320 of the material onto the substrate 120. The substrate 120 may be a table 122 upon which the in-work article 460 is manufactured, or the substrate 120 may be an existing layer 342 of existing beads 340 previously formed by the printhead 140. In one example, the nozzle 150 may have a circular cross-sectional shape resulting in a cylindrical shape of the pre-flattened bead 320. However, in other examples not shown, the nozzle 150 may have an alternative cross-sectional shape such as a rectangular cross-sectional shape or a square cross-sectional shape for forming the pre-flattened bead 320 in a corresponding shape. During extrusion of the material to form the new bead 324, the printhead 140 may move relative to the table 122 which may be stationary. In some examples, the table 122 may be movable via a table movement system (not shown) in coordination with movement of the printhead 140 during forming of the new bead 324. In still further examples not shown, the table 122 may be movable and the printhead 140 may be stationary during forming of a new bead 324.

In FIGS. 3-4, the compression device 160 may be configured as a compression roller 162 which may be freely rotatable. The compression device 160 is located downstream of the nozzle 150 and may be configured to compress the pre-flattened bead 320 against the substrate 120 to form the new bead 324 as a flattened bead 322. In addition, during flattening of the pre-flattened bead 320, the compression device 160 may urge the material of the pre-flattened bead 320 into nesting relation against one or more existing beads 340 in a beneath layer 344 and/or in a new layer 326 being formed as a means to at least partially fill one or more gaps 432 (FIGS. 17 and 19) or notches 420 (FIG. 9) that may extend along a lengthwise direction between the new bead 324 and one or more existing beads 340. The compression device 160 may have a smooth surface for imparting a smooth surface finish on the bead top portion of the new bead 324. In addition, the compression device 160 may be configured to form each new bead 324 with a generally flat or planar bead upper surface for supporting a new bead 324. Furthermore, the compression device 160 may be configured to form each new bead 324 with a bead height 404 (FIG. 9) that is consistent (e.g., within 10 percent) with the bead height 404 of existing beads 340.

The compression device 160 may be mounted to a rotatable base 144 of the printhead 140. The rotatable base 144 may rotate when the printhead 140 changes direction along the head path as a means to maintain the compression device 160 behind the nozzle 150 at all times during extrusion of the material for flattening the material after extrusion onto the substrate 120. In an example, the rotatable base 144 may be servo-controlled for changing the orientation of the compression device 160 in correspondence with changes in direction of the printhead 140. Although shown as a compression roller 162, the compression device 160 may be provided in alternative configurations such as a compression shoe configured to slide over the pre-flattened bead 320 and compress the pre-flattened bead 320 into a flattened bead 322 (i.e., the new bead 324).

The compression device 160 may be maintained (e.g., via the control system 200) at a temperature that promotes either heating or cooling of the new bead 324 during the flattening process. For example, the compression device 160 may be maintained at a temperature that promotes fusing of the new bead 324 to existing beads 340 during the flattening process. Alternatively or additionally, the compression device 160 may be maintained at a temperature that promotes solidification of the new bead 324 to allow the new bead 324 to support the next layer.

The printhead 140 may be configured to extrude any one a variety of different types of materials. In one example, pellets (not shown) of material may be loaded into a hopper (not shown) and melted into molten material that may be forced by a pump (not shown) through the nozzle 150. The printhead 140 may be configured to maintain the material at a temperature that allows for extrusion and flattening of the material onto the substrate 120. For example, the material may be at an elevated temperature that facilitates extrusion as a pre-flattened bead 320 from the nozzle 150, and allowing the pre-flattened bead 320 to bend from a perpendicular orientation of the nozzle 150 relative to the substrate 120, to a parallel orientation of the pre-flattened bead 320 on the substrate 120. Examples of materials that the printhead 140 may extrude include glass material, ceramic material, metallic material, polymeric material, or any combination thereof. Polymeric material may include thermosetting material or thermoplastic material. For example, polymeric material may include acrylonitrile butadiene styrene, polylactic acid, polyphenylene sulfide, Nylon™, polycarbonate, polyether ether ketone (PEEK), polyether ketone ketone PEKK, or any one a variety of other polymeric materials.

In some examples, the printhead 140 may be configured to extrude material containing reinforcing fibers (not shown) formed of glass, graphite, ceramic, metallic, and/or polymeric material. Such reinforcing fibers may be provided as short, chopped fibers or as continuous and/or unidirectional reinforcing fibers (not shown) that may be introduced into the polymeric material during feeding of the polymeric material to the nozzle 150. In an example printhead 140 not shown, metallic (e.g., steel, aluminum, etc.) wire feedstock may be dispensed from a printhead 140 as an alternative to extruding molten material. The metallic wire feedstock may be melted with a heating device (not shown) providing a localized high-temperature source for melting the wire feedstock as it is dispensed to form a new bead 324 of material onto a substrate 120. For example, a printhead 140 may include a resistance heating element configured to melt the wire feedstock as it is dispensed from the printhead 140 which may allow for shaping into a desired cross-sectional shape. Alternatively or additionally, the printhead 140 may include an arc-welding torch, a laser, and/or an electron beam to melt the wire feedstock as it is dispensed from the printhead 140 and/or as the wire feedstock contacts the bead laydown point 302.

Referring to FIG. 3-4, as mentioned above, the printhead 140 includes at least one profilometer 180 for measuring in-work cross-sectional profiles 464 of the in-work article 460 during layer-by-layer manufacturing. In an example, one or more of the profilometers 180 may be mounted to the printhead 140 such as to the rotatable base 144 of the printhead housing 142 to allow the profilometers 180 to change orientation in correspondence with changes in the direction of the printhead 140 moving along the head path during the forming of a new bead 324. The one or more profilometers 180 may continuously or periodically measure (e.g., in real time) the in-work cross-sectional profile 464 of existing beads 340 in an existing layer 342 located immediately below a new layer 326 in which the new bead 324 is being formed. Alternatively or additionally, the geometric measurement of the in-work cross-sectional profile 464 may include the in-work cross-sectional profiles 464 of one or more existing beads 340 in a new layer 326 containing the new bead 324, and including an adjacent bead 328 against which the new bead 324 is being formed.

The one or more profilometers 180 may be provided in any one of a variety of configurations. For example, each profilometer 180 may be configured as a non-contact device for measuring a cross-sectional profile. In one example, the profilometer 180 may be a laser profilometer configured to emit one or more laser beams within a scanning plane 182. For example, a laser profilometer may be configured to emit a single laser beam configured to scan back and forth within a scanning angle of a scanning plane 182. Alternatively, a laser profilometer may be configured to emit multiple laser beams (e.g., FIG. 7) within a scanning plane 182. Depending upon the scanning angle, a laser profilometer may emit laser beams that impinge at predetermined locations of a surface contour being scanned. For example, a laser profilometer may emit laser beams that impinge on a minimum of 20 points uniformly distributed across a surface contour defined by existing beads 340 of which the in-work cross-sectional profile 464 is being measured.

A laser profilometer may be configured as a linear scanning profilometer configured to scan in a two-dimensional direction. For example, one or more of the laser profilometers may be configured to scan a laser beam along scanning plane 182 oriented in a lateral direction 184 (FIG. 3) perpendicular to a direction of travel of the printhead 140, or along a longitudinal direction 188 (FIG. 3) parallel to the direction of travel of the printhead 140, or in a combination of the lateral direction 184 and the longitudinal direction 188 or any other direction. One example of a laser profilometer is a high-speed laser profile designated as the LJ-V7000 Series available from Keyence Corporation of Itasca, Ill. In an example, a laser profilometer may use a blue laser (e.g., frequency band of 450-490 nm) to provide for relatively high accuracy of measurement of in-work cross-sectional profiles 464. However, the printhead 140 may include one or more laser profilometers that use lasers operating in other frequencies, such as a red laser.

Referring to FIG. 4, the printhead 140 includes one or more profilometers 180 configured to measure in-work cross-sectional profiles 464, as mentioned above. The profilometers 180 may be mounted to the printhead 140 at one or more locations relative to the bead laydown point 302. For example, the printhead 140 may include one or more profilometers 180 configured to measure at least one in-work cross-sectional profile 464 representing the contour of the existing beads 340 at a pre-laydown location 300 upstream (e.g., up to several inches or more) of the bead laydown point 302. The bead laydown point 302 may be defined as the location where the leading edge portion of pre-flattened bead 320 first makes contact with the substrate 120 during extrusion of material from the nozzle 150. The printhead 140 may also include one or more profilometers 180 at a pre-flattened location 304 between the nozzle 150 and the compression device 160 for measuring an in-work cross-sectional 464 of the contour of the pre-flattened bead 320 and the existing beads 340 over which and/or against which the new bead 324 is being formed.

A printhead 140 may additionally include one or more profilometers 180 at a post-flattened location 306 immediately (e.g., up to several inches or more) downstream of the compression device 160 for measuring an in-work cross-sectional profile 464 of the contour of the new bead 324 and the existing beads 340 located beneath and adjacent to the new bead 324. The printhead 140 may include one or more profilometers 180 at any one of the above-describe locations. The profilometers 180 may be configured to measure in-work cross-sectional profiles 464 along any one of a variety of scanning planes 182. For example, FIG. 4 shows an example of printhead 140 having two profilometers 180 at the pre-laydown location 300, including a lateral profilometer 186 configured to measure an in-work cross-sectional profile 464 along a lateral direction 184 (FIG. 3) by scanning a laser along a scanning plane 182 oriented perpendicular to the direction of travel of the printhead 140, and a longitudinal profilometer 190 configured to measure an in-work cross-sectional profile 464 along a longitudinal direction 188 (FIG. 3) by scanning a laser along a scanning plane 182 oriented parallel to the direction of travel of the printhead 140. Measuring the in-work cross-sectional profile 464 along the longitudinal direction 188 allows for measuring the contour of the notch 420 between terminating ends 362 of existing beads 340 (FIGS. 4 and 40), or between the intersection of a terminating end 362 of an existing bead 340 with the side of another existing bead 340 (e.g., FIG. 41), as described below.

Figure 6:
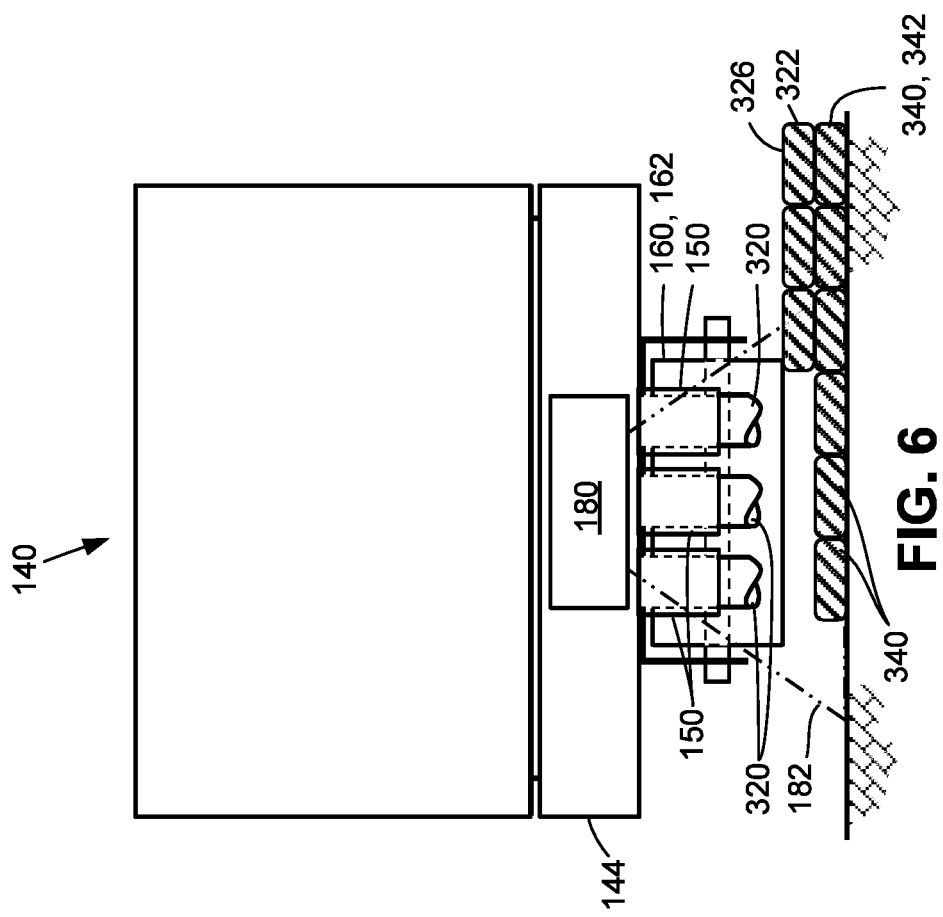
FIG. 6 is a front view of a further example of a printhead having a plurality of nozzles.
Figure 5:
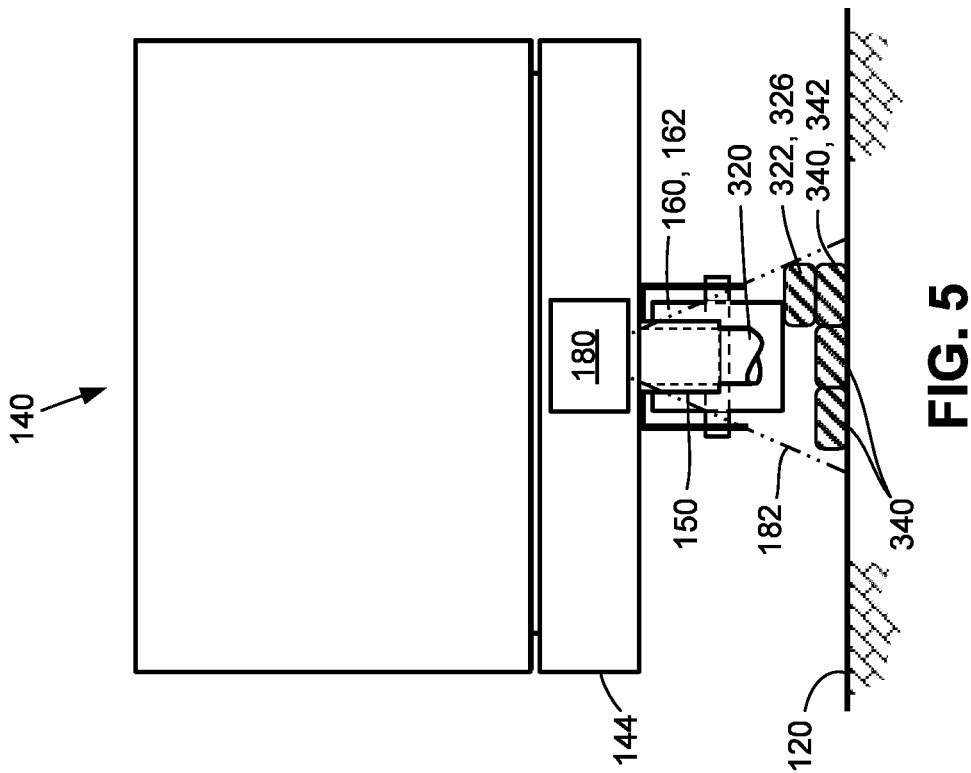
FIG. 5 is a front view of an example of a printhead having a single nozzle.

Referring to FIGS. 5-6, shown in FIG. 5 is a front view of an example of a printhead 140 having a single nozzle 150 configured for forming a single new bead 324 (FIG. 13). FIG. 6 is a front view of an example of a printhead 140 having a plurality of nozzles 150 for forming a corresponding plurality of new beads 324. In FIG. 6, the plurality of nozzles 150 are arranged in a linear array and may be configured to simultaneously extrude material onto the substrate 120 to simultaneously form a corresponding plurality of pre-flattened beads 320. The printhead 140 may include at least one compression device 160 such as a compression roller 162 configured to simultaneously flatten the pre-flattened beads 320 into flattened beads 322 (e.g., new beads 324) preferably arranged in side-by-side contacting relation with each other.

FIG. 7 is a sectional view of an example of a profilometer 180 at a pre-laydown location 300. The profilometer 180 is shown scanning a laser along a scanning plane 182 oriented parallel to the lateral direction 184 (FIG. 3) for measuring an in-work cross-sectional profile 464 (FIG. 8) of the existing beads 340 of an in-work article 460. FIG. 8 shows an example of the in-work cross-sectional profile 464 measured by the profilometer 180 at the pre-laydown location 300. The in-work cross-sectional profile 464 represents the surface contour of the existing beads 340 in a beneath layer 344 over which a new bead 324 (FIGS. 3-4) is to be formed, and also represents the surface contour of an adjacent bead 328 (e.g., an existing bead 340) against which the new bead 324 is to be positioned. FIG. 9 is a magnified view of the in-work cross-sectional profile 464 of FIG. 8 showing the profile features 400 of the in-work cross-sectional profile 464. The profile features 400 may include the bead lateral location 402 of the existing beads 340 (FIG. 8) in the beneath layer 344 (FIG. 8) and the new layer 326 (FIG. 8), and may additionally include the bead size and the bead shape of the existing beads 340. The bead size may include the bead width 406 and the bead height 404. In addition, the profile features 400 may include the notch size and the notch shape of each notch 420 between existing beads 340. The notch size may include the notch width 426 and the notch depth 422.

As mentioned above, during manufacturing of an in-work article 460, the control system 200 (FIG. 2) is configured to continuously or periodically perform a profile comparison of the in-work profile data 462 to reference profile data 472 of a reference article 470, and make necessary adjustments to one or more bead forming parameters 240 (FIG. 2) to reduce or prevent the occurrence of nonconformities 430 (e.g., FIGS. 17, 19, 21, etc.) in the in-work article 460. The bead forming parameters 240 may include path parameters 242 and/or process parameters 244. Path parameters 242 may include the head path of the printhead 140. The head path may define directions for movement and orientation of the printhead 140 and/or movement and orientation of the substrate 120 during printing of an in-work article 460. For example, the head path may include multiple path segments which may be described as a sequence of directions and corresponding distances of travel along which the printhead 140 moves during layer-by-layer manufacturing of the in-work article 460. The head path may be defined by the computer readable program instructions 224 (FIG. 2) for operation of the head manufacturing system 100. The path parameters 242 may also include the head travel speed of the printhead 140 along each path segment of the head path.

As mentioned above, the bead forming parameters 240 may also include process parameters 244 regarding processing operations of the printhead 140 during movement along the head path. The process parameters 244 may include a material temperature at which the material is extruded onto the substrate 120. As mentioned above, the material may be extruded at a temperature that allows for fusing of a new bead 324 to existing beads 340, and that also promotes solidification of the new bead 324 to an extent allowing the new bead 324 to support another layer of material. The process parameters 244 may also include a material feed rate (e.g., volumetric) at which material passes through a nozzle 150 and is extruded onto the substrate 120. Controlling the material feed rate may provide a means to control the bead width 406 (e.g., FIG. 12) of the pre-flattened bead 320 which therefore affects the bead size of the new bead 324. In some examples, the printhead 140 may be configured to extrude a pre-flattened bead 320 having a bead diameter in the range of 0.12 inch to 3.0 inches although larger and smaller diameters are possible. For example, the pre-flattened bead 320 may be extruded in a bead diameter of from 0.25-1.0 inch. The material feed rate may be synchronized with the head travel speed to achieve a desired size of the pre-flattened bead 320 which, in turn, affects the size (e.g., the bead width 406 and the bead height 404) of the new bead 324 (i.e., the pre-flattened bead 320 after flattening).

The process parameters 244 may also include the bead lay rate (e.g., inches per unit time) at which a new bead 324 is formed on the substrate 120, and which may be a function of the head travel speed and the material feed rate as described above. Additional process parameters 244 may include the temperature of the compression device 160 (e.g., compression roller 162) of the printhead 140 for increasing or decreasing the temperature of the material during flattening of the pre-flattened bead 320 by the compression device 160. For example, the temperature of the compression device 160 may be increased to slightly reduce the viscosity of the material to promote the material filling in the notches 420 between the new bead 324 and the existing beads 340 and/or to promote the fusing of the new bead 324 to the existing beads 340. Other process parameters 244 include the vertical position of the compression device 160 for controlling the bead height 404 (FIG. 19) of the new bead 324. For example, the compression device 160 may be vertically adjustable to allow for adjustment of the bead height 404 such that the new bead 324 is substantially equal to (e.g., within 10 percent of) the bead height 404 of existing beads 340. The process parameters 244 may also include the compaction pressure applied by the compression device 160 onto the pre-flattened bead 320 against the substrate 120 and against one or more existing beads 340 during the flattening of the pre-flattened bead 320.

As described in greater detail below, the control system 200 may perform the profile comparison by comparing the profile features 400 (FIG. 9) of an in-work cross-sectional profile 464 of an in-work article 460 to corresponding profile features 400 of a reference cross-sectional profile 474 of a reference article 470 (FIG. 2). Profile features 400 that may be included in the profile comparison include the above-mentioned bead lateral location 402, bead size, bead shape, notch size, and notch shape. In FIGS. 7-9, the in-work article 460 is of nominal construction and may represent an as-designed version of the in-work article 460. In this regard, the existing beads 340 in FIG. 7 may be sized, shaped, and positioned within design specifications such that the profile features 400 in FIG. 9 represent profile features 400 of a nominal cross-sectional profile 484 (FIG. 2) of a nominal article 480 (FIG. 2). The nominal article 480 may be the reference article 470 against which the in-work article 460 is continuously compared during the manufacturing of the in-work article 460.

In another example mentioned above, the reference profile data 472 may be simulated profile data 494 of a simulated article 492, which may be a computer model (e.g., a CAD model 222) of the in-work article 460 and which may represent the above-mentioned as-designed version of the in-work article 460. The simulated profile data 494 may include simulated cross-sectional profiles 496 taken at a plurality of simulated profile locations 498. The simulated profile data 494 may additionally include profile-to-void data 488 including size and location information on voids 442 (if any) in the simulated article 492 at one or more simulated profile locations 498. The simulated cross-sectional profile 496 may be generated by analysis of the simulated article 492. For example, the simulated article 492 may be queried and/or measurements of profile features (e.g., bead size, bead shape, notch size, notch shape) may be extracted from simulated cross-sectional profiles 496 at a plurality of simulated profile locations 498 in the simulated article 492. The measurements may be stored in the memory 202 and accessed during the profile comparison performed by the control system 200 during manufacturing of an in-work article 460 for assessing whether one or more bead forming parameters 240 require adjustment in order to reduce a nonconformity 430 in the in-work article 460 to a size no larger than the nonconformity 430 at a corresponding simulated profile location 498 in the simulated article 492.

Figure 11:
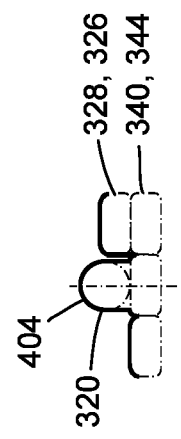
FIG. 11 shows an example of an in-work cross-sectional profile taken at the pre-flattened location.
Figure 10:
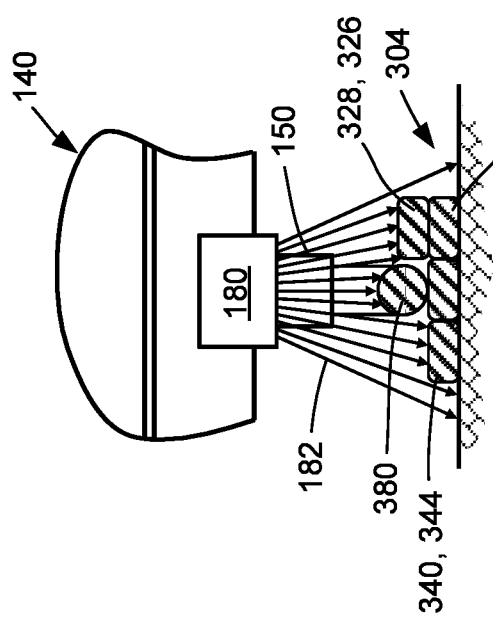
FIG. 10 is a partial sectional view taken of the printhead taken along line 10-10 of FIG. 4 and illustrating the profilometer measuring an in-work cross-sectional profile of existing beads and a pre-flattened bead at the pre-flattened location.
Figure 12:
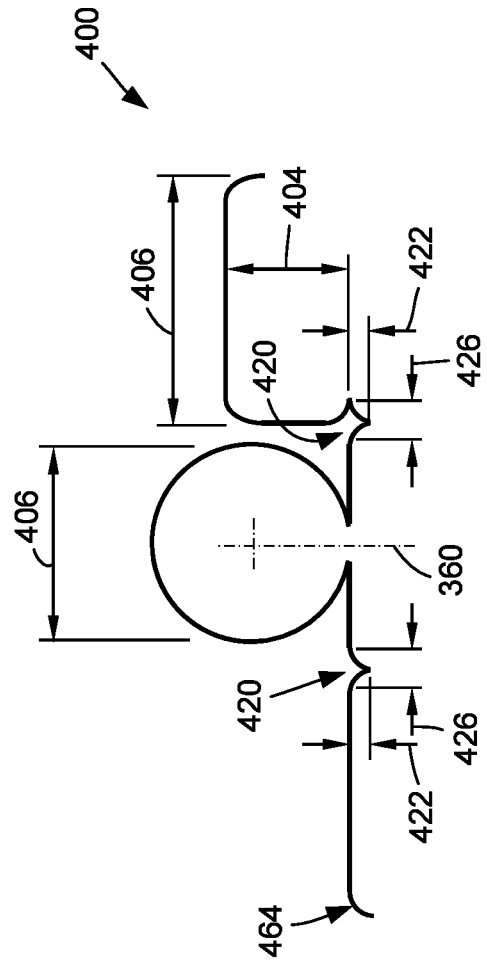
FIG. 12 is a magnified view of the in-work cross-sectional profile of FIG. 11 and showing the profile features.

FIG. 10 is a sectional view of an example of a profilometer 180 of a printhead 140 at a pre-flattened location 304 and showing the profilometer 180 scanning a laser along a scanning plane 182 oriented parallel to the lateral direction 184 (FIG. 3). FIG. 11 shows an example of the in-work cross-sectional profile 464 measured by the profilometer 180 at the pre-flattened location 304. The in-work cross-sectional profile 464 represents the surface contour of the pre-flattened bead 320 and the existing beads 340 in the beneath layer 344 over which the pre-flattened bead 320 is located, and also represents the surface contour of the adjacent bead 328 against which the new bead 324 (FIG. 13) is to be positioned after the pre-flattened bead 320 has been flattened by the compression device (not shown). FIG. 12 is a magnified view of the in-work cross-sectional profile 464 of FIG. 11 and showing the above-mentioned profile features 400 including the bead width 406 (e.g., bead diameter) and the bead lateral location 402. As mentioned above with regard to FIGS. 7-9, the in-work article 460 in FIGS. 10-12 may be of nominal construction such that the profile features 400 in FIG. 12 may represent the profile features 400 of a nominal cross-sectional profile 484 (FIG. 2) of a nominal article 480 (FIG. 2) that the control system 200 may use as the reference article 470 in the profile comparison. For example, in FIG. 12, the bead centerline 360 of the pre-flattened bead 320 is aligned with the bead centerline 360 of the existing bead 340 over which the pre-flattened bead 320 is placed.

FIG. 13 is a sectional view of an example of a profilometer 180 at a post-flattened location 306 and showing the profilometer 180 scanning a laser along the lateral direction 184 (FIG. 3). FIG. 14 shows an example of the in-work cross-sectional profile 464 measured by the profilometer 180 at the post-flattened location 306. In FIG. 14, the in-work cross-sectional profile 464 represents the surface contour of the new bead 324 resulting from the flattening of the pre-flattened bead 320 (FIG. 10), and additionally represents the surface contour of the existing beads 340 in the beneath layer 344 and the adjacent bead 328 against which the new bead 324 is positioned. FIG. 15 is a magnified view of the in-work cross-sectional profile 464 of FIG. 14 and showing the profile features 400 including the bead lateral location 402 and bead size of the new bead 324 and the existing beads 340, and additionally showing the notch size and notch shape of the notch 420 between the new bead 324 and the existing beads 340. As mentioned above with regard to FIGS. 7-12, the in-work article 460 shown in FIGS. 13-15 may be of nominal construction such that the profile features 400 in FIG. 15 represent the profile features 400 of a nominal cross-sectional profile 484 (FIG. 2) of a nominal article 480 (FIG. 2). For example, in FIG. 15, the bead centerline 360 of the new bead 324 may be aligned with the bead centerline 360 of the existing bead 340 over which the new bead 324 is formed. In addition, the bead width 406 and the bead height 404 of the new bead 324 may be equivalent respectively to the bead width 406 and the bead height 404 of the existing beads 340.

As an alternative to or in addition to using nominal profile data 482 (FIG. 2) as the reference profile data 472 (FIG. 2), the control system 200 (FIG. 2) may use machine-learned profile data 490 (FIG. 2) which may include a plurality of in-work cross-sectional profiles 464 previously-generated (e.g., previously measured and recorded) at a corresponding plurality of in-work profile locations 466 during manufacturing of the in-work article 460. The control system 200 may be configured to continuously compare the in-work cross-sectional profiles 464 and identify, via machine learning, one or more patterns of nonconformities 430 associated with manufacturing the in-work article 460. For example, the control system 200 may identify a pattern of bead mislocation 434 of one or more existing beads 340 and/or of the new bead 324 at one or types of locations in the in-work article 460, such as at certain types of corners (i.e., locations where the beads change direction) of the in-work article 460, or at other locations. Alternatively or additionally, the control system 200 may identify a pattern of mis-sized beads 408 (e.g., an undersized bead 410—FIG. 18; an oversized bead 412—FIG. 20) at one or more types of locations in the in-work article 460. In still further examples, the control system 200 may identify a pattern of gaps 432 occurring at certain types of locations in the in-work article 460.

Upon identifying one or more patterns of nonconformities 430, the control system 200 may be configured to adjust, based on the patterns, one or more of the bead forming parameters 240 associated with the forming of a new bead 324 in a manner to reduce or prevent the occurrence of the nonconformities 430 identified in the pattern. For example, upon identifying a pattern of bead mislocation 434 at a certain type of location or geometric feature (e.g., at a corner) in the in-work article 460, the control system 200 may adjust the head path as the printhead 140 approaches the location identified in the pattern as a means to prevent further mislocation of the new bead 324 and thereby reduce or prevent the occurrence of a void 442 at the location identified in the pattern. In another example, upon identifying a pattern of undersized beads 410 occurring at a certain types of geometry (e.g., at certain corners) in the in-work article 460, the control system 200 may adjust one or more process parameters 244 such as the head travel speed and/or the material feed rate as the printhead 140 approaches the location identified in the pattern as a means to locally increase the bead size of the new bead 324 at the location identified in the pattern.

Figure 16:
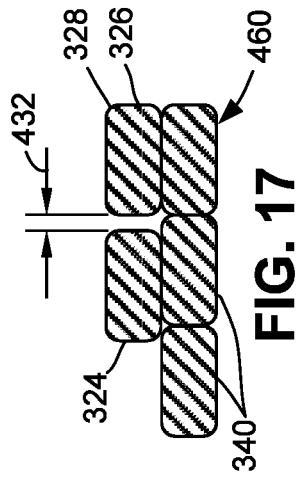
FIG. 16 is a cross-sectional view of a nonconformity occurring during the forming of a new bead and in which the pre-flattened bead is mislocated relative to the existing beads.
Figure 17:
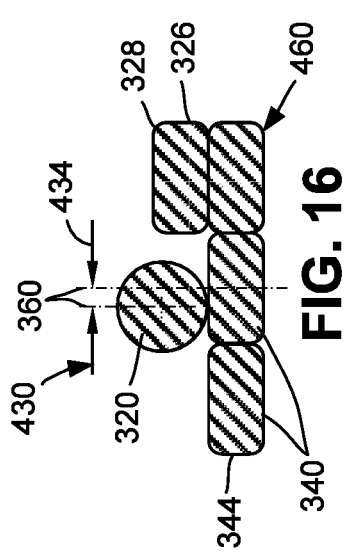
FIG. 17 is a cross-sectional view of the existing beads and the pre-flattened bead of FIG. 16 after flattening to form a new bead.

FIG. 16-21 show an in-work article 460 for the purpose of illustrating several examples of various types of nonconformities 430 that may occur during manufacturing of an in-work article 460. FIG. 16 is a cross-sectional view of an example of a bead mislocation 434 in which the pre-flattened bead 320 is mislocated relative to the existing beads 340 which include existing beads 340 in a beneath layer 344 over which the pre-flattened bead 320 is extruded, and also includes an adjacent bead 328 in the new layer 326 containing the pre-flattened bead 320. The bead centerline 360 of the pre-flattened bead 320 is offset from the bead centerline 360 of the existing bead 340 in the existing layer 342 over which the pre-flattened bead 320 is extruded. FIG. 17 is a cross-sectional view of the existing beads 340 and the pre-flattened bead 320 after being flattened to form the new bead 324, and illustrating a gap 432 between the new bead 324 and the adjacent bead 328 (e.g., an existing bead 340) as a result of the bead mislocation 434 (FIG. 16) of the pre-flattened bead 320. Such gap 432 may result in a void (not shown) in the in-work article 460 when completed.

Figure 18:
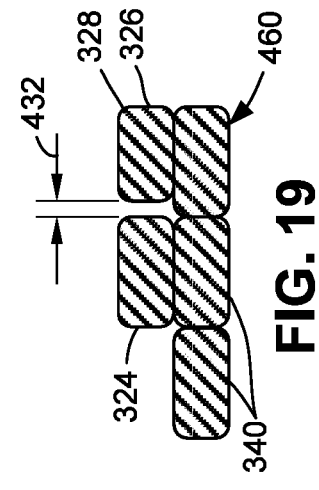
FIG. 18 is a cross-sectional view of a further example of a nonconformity in which the pre-flattened bead is properly located but the adjacent bead is undersized.
Figure 19:
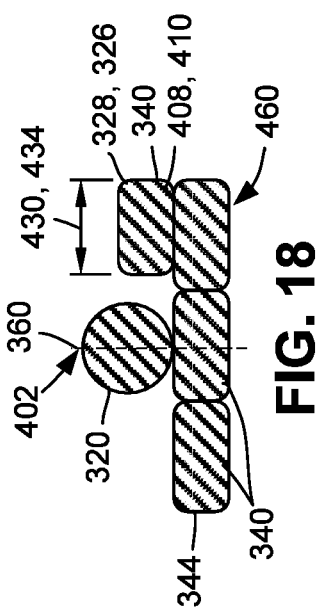
FIG. 19 is a cross-sectional view of the existing beads and the pre-flattened bead of FIG. 18 after flattening to form a new bead.

FIG. 18 is a cross-sectional view of an example of a nonconformity 430 in which the pre-flattened bead 320 is placed at the correct bead lateral location 402, but the adjacent bead 328 (i.e., the existing bead 340 against which the pre-flattened bead 320 is placed) is undersized (e.g., a mis-sized bead 408). The undersized bead 410 may have occurred as a result of an error in one or more of the bead forming parameters 240 (FIG. 2) during forming of the adjacent bead 328. For example, the error in the bead forming parameters 240 may include an excessively high head travel speed of the printhead 140 (FIG. 2) and/or an excessively low material feed rate at which is passed (e.g., pumped) through the nozzle 150 (FIG. 3) of the printhead 140. FIG. 19 is a cross-sectional view of the existing beads 340 and pre-flattened bead 320 of FIG. 18 after flattening to form the new bead 324, and which results in a gap 432 between the new bead 324 and the adjacent bead 328 as a result of the adjacent bead 328 being undersized. As mentioned above, a gap 432 may result in a void 442 in the in-work article 460 when completed.

Figure 20:
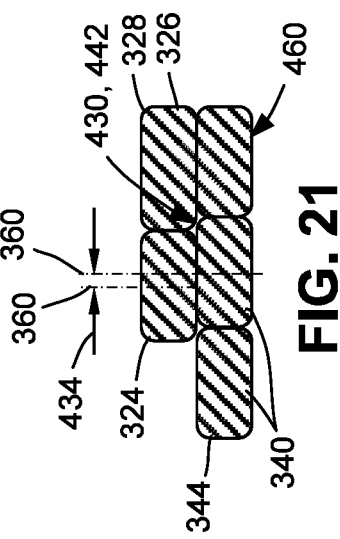
FIG. 20 is a cross-sectional view of a further example of a nonconformity in which the pre-flattened bead is properly located but the adjacent bead is oversized.
Figure 21:
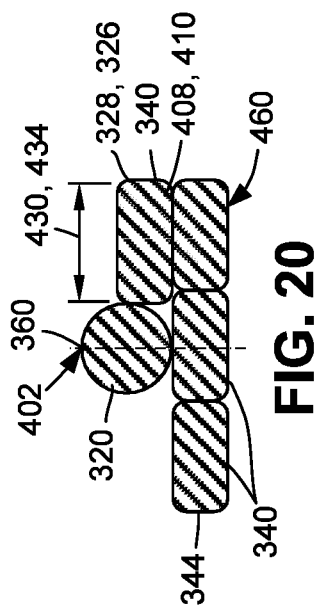
FIG. 21 is a cross-sectional view of the new bead in FIG. 20 being mislocated after flattening as a result of the adjacent bead being oversized.

FIG. 20 is a cross-sectional view of an example of a nonconformity 430 in which the pre-flattened bead 320 is properly located but the adjacent bead 328 is oversized (e.g., a mis-sized bead 408), and which may be the result of an error in one or more bead forming parameters 240 including an error in the head travel speed and/or an error in the material feed rate of the printhead 140 during extrusion of the pre-flattened bead 320. FIG. 21 is a cross-sectional view of the new bead 324 in FIG. 20 being mislocated as a result of the adjacent bead 328 being oversized. For example, the bead centerline 360 of the new bead 324 may be offset from the bead centerline 360 of the existing bead 340 in the beneath layer 344. As a result of the oversized bead 412, subsequently formed new beads 324 may also be mislocated.

Also shown in FIG. 21 is an example of a nonconformity 430 in the form of a void 442, one or more of which may remain in the in-work article 460 after manufacturing is complete and the in-work article 460 has cured or solidified. A void 442 may occur between the surfaces of two or more existing beads 340 of the in-work article 460. Although a single void 442 is shown in FIG. 21, an in-work article 460 may include any number of voids 442 extending along any portion of the in-work article 460. As mentioned above, a void 442 may also occur as a result of a gap 432 between a new bead 324 and an adjacent bead 328 such as the gap 432 illustrated in FIGS. 17 and 19. A void 442 may also occur as a result of a surface cavity 436 (e.g., FIGS. 39 and 41) on a surface of an existing bead 340 during its formation, as described below.

In the present disclosure, voids 442 (e.g., FIG. 21) may be detected and measured by nondestructive evaluation (e.g., x-ray imaging, computed tomography imaging, etc.) of a reference article 470 and/or by physical inspection of a reference article 470. As mentioned above, a reference article 470 may be an in-work article 460 that has been completed and designated as a nominal article 480 for use as a reference standard against which future in-work articles 460 may be compared during manufacturing as a means to assess whether adjustment of bead forming parameters 240 is necessary. In an example, a nominal article 480 may be manufactured using the same type of material and the same type of printhead 140 to be used during future manufacturing of in-work articles 460. A nominal article 480 may be physically sectioned (e.g., in a laboratory) and nominal cross-sectional profiles 484 may be measured at a plurality of nominal profile locations 486 within the nominal article 480 to generate the above-described nominal profile data 482 for comparison by the control system 200 to in-work profile data 462 continuously generated (using one or more profilometers 180) during manufacturing of an in-work article 460.

The measurement values of the profile features 400 (e.g., numerical values for the bead lateral location, bead shape, bead size, notch size, and/or notch shape) associated with the nominal cross-sectional profiles 484 may be adjusted to compensate for shrinkage of the bead material during cool down. In this regard, during extrusion from the printhead 140, the material may be at a higher temperature than the existing beads 340 and/or higher than ambient temperature. The new bead 324 of material may shrink as it cools to room temperature. So that the profile comparison of the in-work profile data 452 (e.g., when the material is hot) to the nominal profile data 482 (e.g., reference profile data 472) is accurate, it may be necessary to compensate for such shrinkage by applying an adjustment factor to the measurements of the nominal cross-sectional profiles 484. For example, an adjustment factor may be applied to increase the value of each profile feature 400 (e.g., of bead width, notch width, etc.) of the nominal article 480 by an amount equal to the shrinkage of such profile feature due to cool down of the material. As mentioned above, the control system 200 is configured to adjust, based on the profile comparison, one or more bead forming parameters 240 in a manner reducing a nonconformity 430 (e.g., a void 442, a gap 432, a bead mislocation 434, a mis-sized bead 408) potentially occurring at one or more in-work profile locations 466 to a size no larger than the nonconformity 430 at a corresponding nominal profile locations 486 in the nominal article 480.

As indicated above, the nominal profile data 482 (FIG. 2) (e.g., reference profile data 472) includes nominal cross-sectional profiles 484 and the corresponding three-dimensional location (i.e., the nominal profile location) of each nominal cross-sectional profile 484 that is measured. In addition, the nominal profile data 482 includes data on nonconformities 430 associated with one or more of the nominal cross-sectional profiles 484. As mentioned above, nonconformities 430 such as voids 442 in the nominal article 480 may be detected and measured during evaluation of the nominal article 480. Voids 442 may be measured for void 442 size (e.g., void 442 width and/or void 442 cross-sectional area). The void data may be recorded as profile-to-void data 488 along with the nominal cross-sectional profile 484 to which each void 442 is associated. In one example, the profile-to-void data 488 may be limited to data on voids 442 that are larger than a threshold size. For example, voids 442 having a void 442 width of less than 0.10 inch in the lateral direction 184 may be excluded from the profile-to-void data 488.

FIG. 22 shows an example of an in-work cross-sectional profile 464 of the existing beads 340 and illustrating the mislocation of the pre-flattened bead 320 of FIG. 16 as may be measured by one or more of the above-described profilometers 180 (FIG. 4) of the printhead 140 (FIG. 4). For example, the in-work cross-sectional profile 464 may be measured by a profilometer 180 mounted to the printhead 140 at the pre-laydown location 300 shown in FIG. 4. FIG. 23 is a magnified view of the in-work cross-sectional profile 464 of FIG. 22 showing the profile features 400 (e.g., bead lateral location 402, bead size, notch size, etc.) of the in-work cross-sectional profile 464.

As mentioned above, the control system 200 is configured to perform a profile comparison by comparing at least one profile feature 400 of the in-work cross-sectional profile 464 measured at one or more in-work profile locations 466 to a corresponding profile feature 400 of a reference cross-sectional profile 474 at a corresponding reference profile location 476 for determining which, if any, of the bead forming parameters 240 require adjustment in order to reduce or prevent nonconformities 430 that may otherwise occur in the in-work article 460 at the in-work profile location 466 of the in-work cross-sectional profile 464.

The in-work profile locations 466 of the in-work cross-sectional profile 464 may be automatically correlated (e.g., by the control system 200) to a three-dimensional location of the printhead 140 at the time of measurement of the in-work cross-sectional profile 464 by one or more profilometers 180. In one example, the manufacturing system 100 may include one or more encoders (not shown) that may be used by the head moving system 104 (e.g., the gantry 106 in FIG. 1; a robotic device—not shown) in moving the printhead 140 along the head path. Such encoders may continuously transmit the printhead positional data to the control system 200 for continuous association by the control system 200 to in-work cross-sectional profile 464 measured by the one or more profilometers 180.

As mentioned above, the profile features 400 may include the bead lateral location 402, the bead size, and/or the bead shape of one or more beads defining the cross-sectional profile of at least one of a new layer 326 and a beneath layer 344 located directly below the new layer 326 in which the new bead 324 is to be formed. The bead lateral location 402 may be that of the existing beads 340, the pre-flattened bead 320, and/or the new bead 324. The bead lateral location 402 may be measured relative to the bead centerline 360 of a pre-flattened bead 320 and the bead centerline 360 of one or more existing beads 340 (e.g., in a beneath layer 344, or of an adjacent bead 328), or between the bead centerline 360 of a new bead 324 and the bead centerline 360 of one or more existing beads 340. The profile features 400 may additionally include the bead size such as the bead width 406 and/or the bead height 404 of the existing beads 340, the pre-flattened bead 320, and/or the new bead 324. In addition, the profile features 400 may include the bead shape (e.g., cross-sectional shape—rectangular, square, circular, etc.) of the existing beads 340, the pre-flattened bead 320, and/or the new bead 324.

Additionally, the profile features 400 may include the notch size and/or the notch shape of one or more notches 420 or dips that may exist in the surface profile between beads that define the cross-sectional profile. In some examples, the control system 200 may be configured to record notches 420 having a notch size that exceeds a threshold value (e.g., greater than 0.10 inch). The notch size may include the notch depth 422 (FIG. 23) which may be defined as the vertical distance between the notch apex 424 (FIG. 23) and the top surface of at least one of the existing beads 340 between which the notch 420 is located. The notch size may also include the notch width 426 (FIG. 23) which may be defined as the maximum horizontal width of the notch 420 which may typically be located proximate the top surfaces of the existing beads 340 that define the notch 420. The notch size may also be defined in terms of notch cross-sectional area. The notch shape may be defined in terms of the radius of one or both of the opposing sides of the notch 420.

In one example, when performing a profile comparison, the bead lateral location 402, the bead shape, and/or the bead size of one or more existing beads 340 defining the in-work cross-sectional profile 464 at one or more in-work profile locations 466 may be compared to the bead lateral location 402, the bead shape, and the bead size respectively of corresponding ones of the existing beads 340 which define the reference cross-sectional profile 474 at the corresponding reference profile location 476. Alternatively or additionally, when performing a profile comparison, the notch size and the notch shape between existing beads 340 defining the in-work cross-sectional profile 464 at one or more in-work profile locations 466 may be compared to the bead lateral location 402, the bead shape, and the bead size respectively of corresponding ones of the existing beads 340 defining the reference cross-sectional profile 474 at the corresponding reference profile location 476. The profile comparison performed by the control system 200 may include comparing the sizes and/or shapes of any one or more of the above-noted profile features 400.

Referring back to FIG. 23, shown is a magnified view of the in-work cross-sectional profile 464 of FIG. 22. The profile features 400 of the in-work cross-sectional profile 464 may include the bead lateral location 402 and the bead size (e.g., bead width 406) of the pre-flattened bead 320 and the existing beads 340. The profile features 400 may also include the notch size of the notches 420 between the existing beads 340. In FIG. 23, the bead centerline 360 of the pre-flattened bead 320 is offset from the bead centerline 360 of the existing bead 340 located beneath the pre-flattened bead 320.

FIG. 24 is a cross-sectional view of the existing beads 340 and pre-flattened bead 320 represented in FIGS. 22-23. In response to performing the profile comparison of the in-work cross-sectional profile 464 (e.g., FIG. 23) to a corresponding reference cross-sectional profile 474 (e.g., FIG. 12), the control system 200 is configured to adjust the head path of the printhead 140 (FIG. 3) and cause lateral repositioning of the printhead 140 in a manner causing the pre-flattened bead 320 to be extruded nearer to the adjacent bead 328. After adjustment of the head path by the control system 200, the adjusted head path becomes the new head path. FIG. 25 shows the new bead 324 (i.e., the pre-flattened bead 320 after flattening) in side-by-side contacting relation with the adjacent bead 328, demonstrating the avoidance of a gap 432 (e.g., FIG. 17) that may otherwise occur between the new bead 324 and the adjacent bead 328 if the bead forming parameters 240 were not adjusted.

Figure 27:
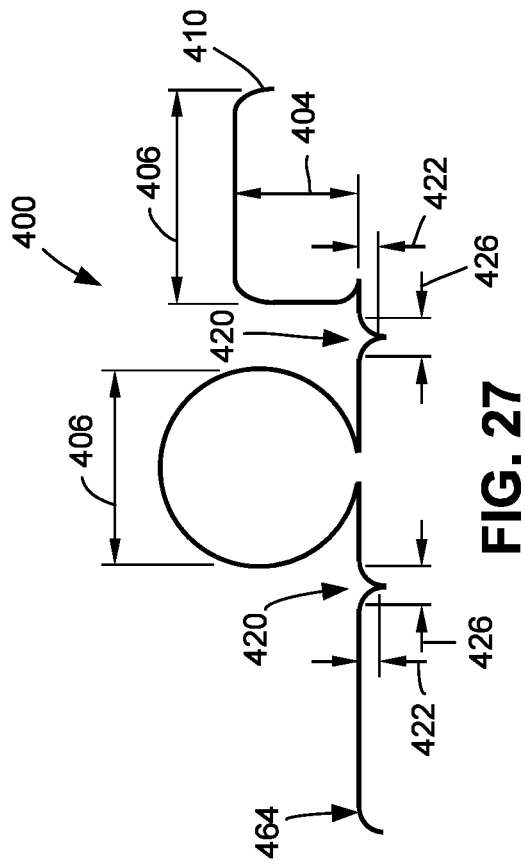
FIG. 27 is a magnified view of the in-work cross-sectional profile of FIG. 26 and illustrating one or more of the profile features that the control system may compare with corresponding profile features of a reference article.
Figure 26:
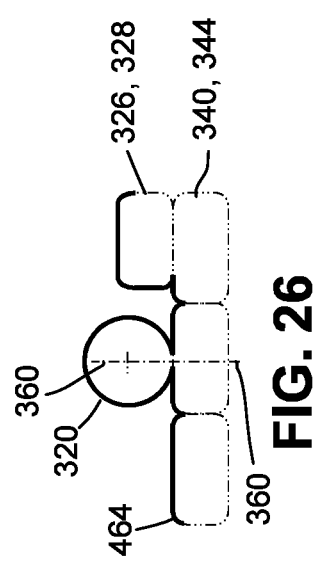
FIG. 26 shows an example of an in-work cross-sectional profile of the existing beads and pre-flattened bead of FIG. 18 in which the adjacent bead is undersized.

FIG. 26 shows an example of an in-work cross-sectional profile 464 of the existing beads 340 and the pre-flattened bead 320 of FIG. 18 as may be measured by one or more profilometers 180 mounted at the pre-flattening location shown in FIG. 4. FIG. 26 illustrates the adjacent bead 328 (e.g., existing bead 340) as an undersized bead 410. FIG. 27 is a magnified view of the in-work cross-sectional profile 464 of FIG. 26 showing the profile features 400 (e.g., bead lateral location 402, bead size, notch size, etc.) that the control system 200 may compare with corresponding profile features 400 of the reference article 470 to determine whether the adjustment of one or more bead forming parameters 240 is necessary in order to reduce or prevent nonconformities 430 in the in-work article 460.

Figure 29:
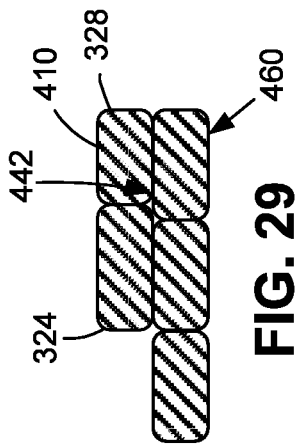
FIG. 29 is a cross-sectional view of the bead configuration of FIG. 28 after the flattening of the pre-flattened bead.
Figure 28:
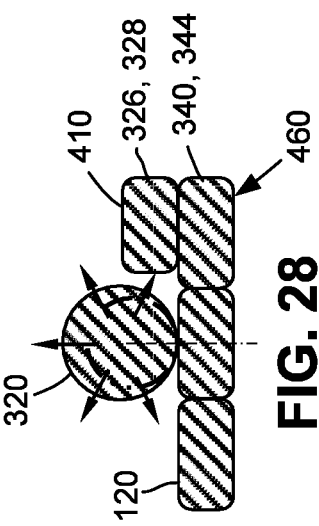
FIG. 28 is a cross-sectional view of the existing beads and pre-flattened bead of FIG. 18 showing an increase in the size of the pre-flattened bead as a result of adjusting one or more bead forming parameters.

FIG. 28 is a cross-sectional view of the existing beads 340 and pre-flattened bead 320 of FIG. 18. In response to performing the profile comparison of the in-work cross-sectional profile 464 (e.g., FIG. 27) to the reference cross-sectional profile 474 (e.g., FIG. 12), the control system 200 is configured to adjust one or more bead forming parameters 240 such as the head travel speed of the printhead 140 and/or the material feed rate at which material is extruded onto the substrate 120. The bead forming parameters 240 may be adjusted in a manner to cause an increase in the bead size of the pre-flattened bead 320 for reducing or preventing the occurrence of a gap 432 (e.g., FIG. 19) between the new bead 324 and the adjacent bead 328. FIG. 29 is a cross-sectional view of the bead configuration of FIG. 28 after flattening of the pre-flattened bead 320 to form the new bead 324 which is shown in side-by-side contacting relation with the adjacent bead 328, and demonstrating the avoidance of a gap 432 that would otherwise occur between the new bead 324 and the adjacent bead 328 if the bead forming parameters 240 were not adjusted. In addition, the adjustment of the bead forming parameters 240 may result in the material of the new bead 324 at least partially filling the notch 420 (e.g., FIG. 27) between the new bead 324 and the adjacent bead 328.

In any one of the examples disclosed herein, the control system 200 may maintain the adjustment of one or more bead forming parameters 240 as long as a nonconformity (e.g., an undersized bead 410) continues to exist. For example, the control system 200 may maintain a reduced head travel speed and/or an increased material feed rate for the length of time that the profile comparison indicates that the adjacent bead 328 is undersized. When the profile comparison indicates that the adjacent bead 328 is no longer undersized, the control system 200 may revert the bead forming parameters 240 back to their previous settings. In this regard, for any one of the examples disclosed herein, the control system 200 may adjust the settings of one or more bead forming parameters 240 temporarily for as long as a nonconformity 430 (e.g., bead mislocation 434, mis-sized bead 408, occurrence of A gap 432, etc.) exists during the manufacturing of the in-work article 460. Alternatively, the control system 200 may maintain the adjusted settings of one or more bead forming parameters 240 for the duration of manufacturing of the in-work article 460.

Figure 31:
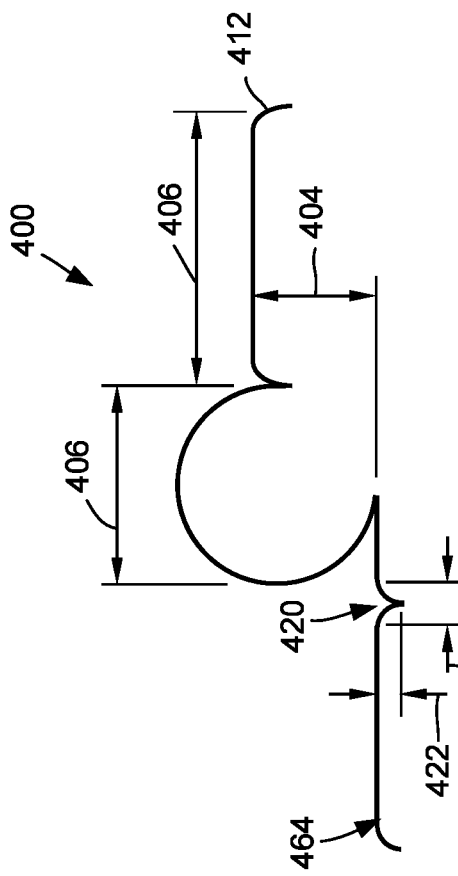
FIG. 31 is a magnified view of the in-work cross-sectional profile of FIG. 30 and illustrating one or more of the profile features that the control system may compare with corresponding profile features of a reference article.
Figure 30:
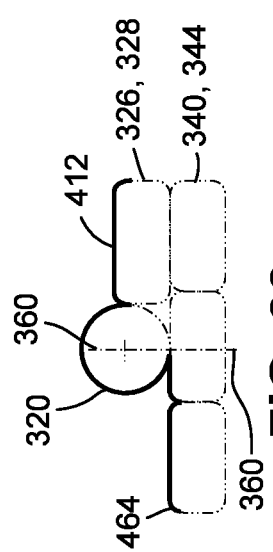
FIG. 30 shows an example of an in-work cross-sectional profile of the existing beads and pre-flattened bead of FIG. 20 in which the adjacent bead is oversized.

FIG. 30 shows an example of an in-work cross-sectional profile 464 of the existing beads 340 and pre-flattened bead 320 of FIG. 20 as may be measured by one or more profilometers 180 mounted at the pre-flattened location 300 shown in FIG. 4. FIG. 30 illustrates the adjacent bead 328 (e.g., existing bead 340) as an oversized bead 412. FIG. 31 is a magnified view of the in-work cross-sectional profile 464 of FIG. 30 showing the profile features 400 (e.g., bead lateral location 402, bead size, notch size, etc.) that the control system 200 may compare with corresponding profile features 400 of a reference article 470 to determine whether the adjustment of one or more bead forming parameters 240 is necessary.

Figure 33:
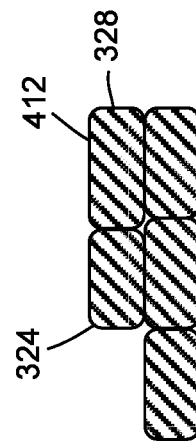
FIG. 33 is a cross-sectional view of the bead configuration of FIG. 32 after the flattening of the pre-flattened bead.
Figure 32:
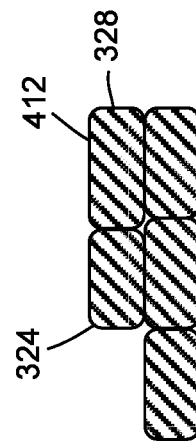
FIG. 32 is a cross-sectional view of the existing beads and pre-flattened bead of FIG. 20 showing a decrease in the size of the pre-flattened bead.

FIG. 32 is a cross-sectional view of the existing beads 340 and pre-flattened bead 320 of FIG. 20 showing a decrease in the size of the pre-flattened bead 320 as a result of the control system 200 adjusting one or more bead forming parameters 240 (e.g., increasing the head travel speed of the printhead 140 and/or reducing material feed rate) as a means to reduce or avoid a bead mislocation (not shown) of the new bead 324 (e.g., the pre-flattened bead 320 after flattening). FIG. 33 is a cross-sectional view of the bead configuration of FIG. 32 after the flattening of the pre-flattened bead 320 to form the new bead 324 which is shown in proper side-by-side contacting relation with the adjacent bead 328.

FIG. 34 shows an example of an in-work cross-sectional profile 464 of existing beads 340 as may be measured by one or more profilometers 180 at the pre-laydown location 300 in FIG. 4. Depending upon the as-designed configuration of the in-work article 460, the adjacent bead 328 (i.e., the bead against which the new bead 324 is to be formed) may be as a mislocated bead. FIG. 35 is a magnified view of the in-work cross-sectional profile 464 of FIG. 34 showing the profile features 400 including bead lateral location 402 of which the control system 200 may compare with corresponding profile features 400 of a reference article 470.

FIG. 36 is a cross-sectional view of the existing beads 340 of FIG. 34 and showing the pre-flattened bead 320 repositioned nearer to the adjacent bead 328 in response to a profile comparison performed by the control system 200. As a result of the profile comparison, the control system 200 may cause the adjustment of the lateral positioning of the printhead 140 for the purpose of extruding the pre-flattened bead 320 nearer to the adjacent bead 328. FIG. 38 is a cross-sectional view of the bead configuration of FIG. 36 after the flattening of the pre-flattened bead 320 to form the new bead 324 which may be better positioned within the in-work article 460. Additionally, the material of the new bead 324 may fill in the notches (not shown) resulting in improved stackup of the new bead 324 and existing beads 340, and thereby preventing voids (not shown) at the noted location in the in-work article 460

FIG. 37 is a cross-sectional view of the existing beads 340 of FIG. 34 and showing the pre-flattened bead 320 at an increased size as a result of the profile comparison and subsequent adjustment of bead forming parameters 240 by control system 200. For example, the control system 200 may adjust the head travel speed of the printhead 140 and/or the material feed rate at which material is extruded onto the substrate 120 in a manner to cause an increase in the bead size of the pre-flattened bead 320 as a means to at least partially fill in one or more notches 420 as shown in FIG. 35 for reducing or preventing the occurrence of voids 442 in the in-work article 460.

FIG. 39 is a perspective view of an example of a portion of a printhead 140 approaching the opposing terminating ends 362 of existing beads 340. The printhead 140 has a lateral profilometer 186 and a longitudinal profilometer 190. The lateral profilometer 186 is shown scanning a laser along a scanning plane 182 oriented along the lateral direction 184 which is perpendicular to the direction of travel of the printhead 140. The lateral profilometer 186 is shown generating an in-work cross-sectional profile 464 of an existing bead 340 along the lateral direction 184. The existing bead 340 has a surface cavity 436 that is represented in the in-work cross-sectional profile 464 measured by the lateral profilometer 186. The printhead 140 also has the longitudinal profilometer 190 which is shown scanning a laser along a scanning plane 182 oriented along a longitudinal direction 188 which is parallel to the direction of travel of the printhead 140. The longitudinal profilometer 190 is shown generating an in-work cross-sectional profile 464 representing the notch 420 between the terminating ends 362 of the existing beads 340.

FIG. 40 shows the in-work cross-sectional profile 464 along the longitudinal direction 188 and illustrating the notch 420 between the terminating ends 362 of the existing beads 340 of FIG. 39. The profiles features 400 may include the notch depth 422 and notch width 426 of the notch 420. During the profile comparison, the control system 200 may determine that one or more of the bead forming parameters 240 require adjustment in anticipation of the printhead 140 approaching the notch 420 between the terminating ends 362 of the existing beads 340. The control system 200 may cause one or more bead forming parameters 240 such as head travel speed and/or material feed rate to be temporarily adjusted in a manner to cause a temporary increase in the bead size of the pre-flattened bead 320 (FIG. 28) during the time period when the nozzle 150 (FIG. 4) passes over the notch 420 as a means to allow the material of the new bead 324 to at least partially fill the notch 420 while maintaining the new bead 324 at a constant bead height 404 (FIG. 29).

FIG. 41 shows the in-work cross-sectional profile 464 along the lateral direction 184 and illustrating the surface cavity 436 in the existing bead 340 of FIG. 39. The profile features 400 may include the cavity depth 440 and the cavity width 438 of the surface cavity 436 in addition to the bead size and bead shape of the existing bead 340. During the profile comparison performed by the control system 200 during movement of the printhead 140, the control system 200 may determine that the bead forming parameters 240 must be adjusted in order to temporarily increase the volume of material in the pre-flattened bead 320 in order to allow the material to at least partially fill the surface cavity 436 for the purpose of reducing or preventing the occurrence of a void 442 in the in-work article 460 at the noted location.

FIG. 42 is a perspective view of an example of a portion of a printhead 140 approaching a location where a terminating end 362 of an existing bead 340 terminates at the side of another existing bead 340. Similar to the arrangement shown in FIG. 39, the printhead 140 has a lateral profilometer 186 and a longitudinal profilometer 190 respectively measuring in-work cross-sectional profiles 464 respectively along the lateral direction 184 (FIG. 39) and along the longitudinal direction 188 (FIG. 39). The in-work cross-sectional profile 464 taken along the longitudinal direction 188 includes a notch 420 between the terminating end 362 of one existing bead 340 and the side of the other existing bead 340. FIG. 43 shows the in-work cross-sectional profile 464 taken along the longitudinal direction 188 and includes profile features 400 including notch width 426 and notch depth 422 of the notch, and further includes the geometry of the intersecting beads and the surface of the table 122 upon which the existing beads 340 are supported. As a result of the profile comparison, the control system 200 may determine that adjustment is necessary for one or more bead forming parameters 240 to causes a temporary increase in the bead size of the pre-flattened bead 320 during the time period when the nozzle 150 passes over the notch 420 in order to allow the material to at least partially fill the notch 420. In any of the above examples, the control system 200 may determine that adjustment of one or more the bead forming parameters 240 is necessary for any one a variety of reasons, and not solely for the purpose of at least partially filling notches 420 between existing beads 340 or for reducing or preventing bead mislocations 434.

Figure 44:
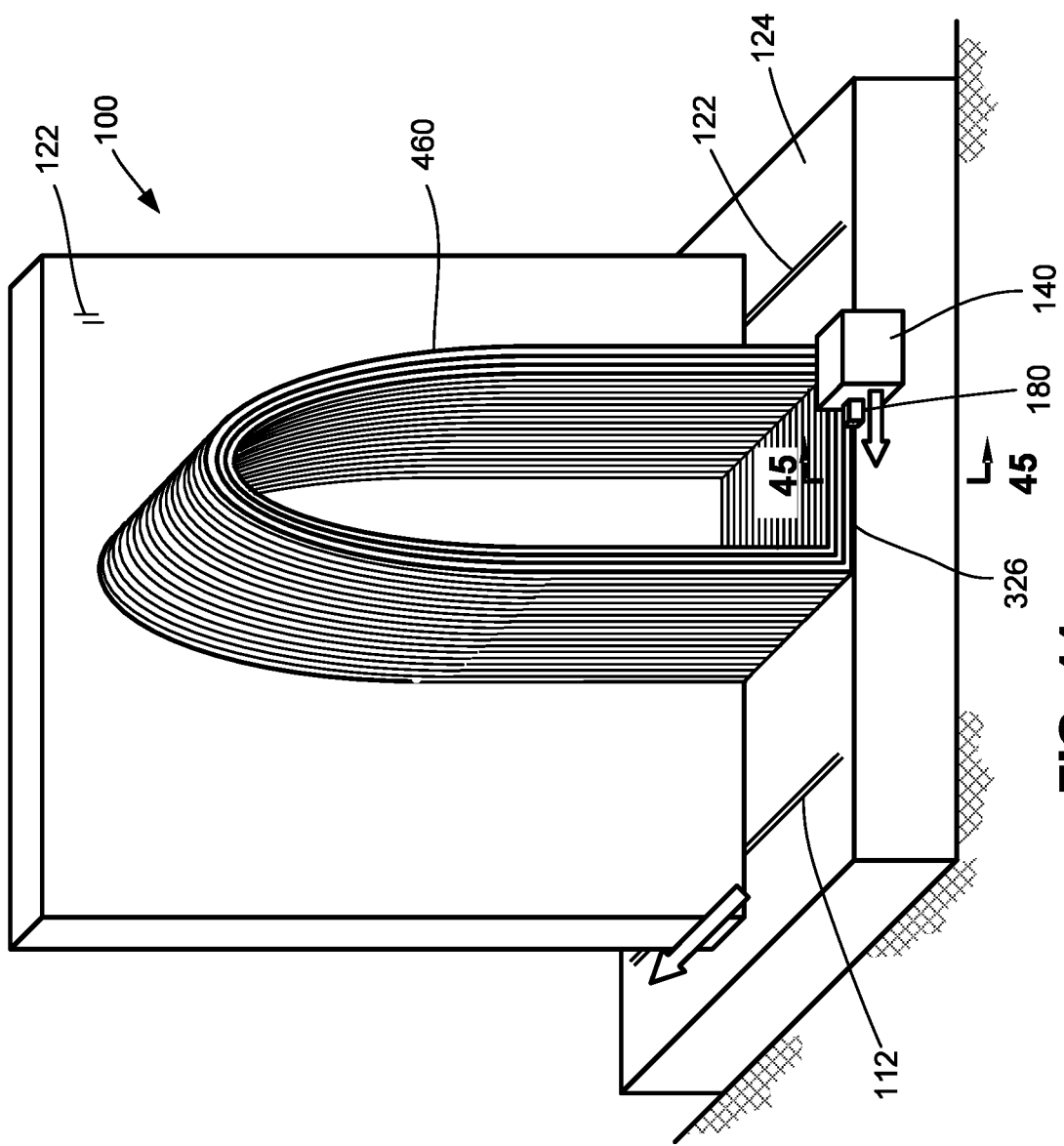
FIG. 44 is a perspective view of an example of a manufacturing system in which the in-work article is supported on a horizontally movable tool and the printhead is oriented for layer-by-layer manufacturing in a horizontal direction.

FIG. 44 is a perspective view of an example of a manufacturing system 100 in which the in-work article 460 is supported on a horizontal surface of a tool 124 and the printhead 140 is oriented for layer-by-layer manufacturing in a horizontal direction. The base of the in-work article 460 is attached to the table 122 which is vertically oriented and which is horizontally movable along the horizontal tracks 112 of the tool 124. After the forming of each new layer 326, the table 122 moves incrementally along the horizontal tracks 112, pulling the in-work article 460 with it as the in-work article 460 slides along the horizontal surface of the tool 124.

FIG. 45 is a perspective view of the printhead 140 (head moving system intentionally omitted) and a portion of the existing beads 340 and tool 124 of FIG. 45. Also shown is a profilometer 180 measuring the in-work cross-sectional profile 464 of the existing beads 340 along a lateral direction 184 which is perpendicular to the direction of travel of the printhead 140 during forming of a new bead 324. FIG. 46 is a magnified sectional view of a portion of the existing beads 340 and tool 124 of FIG. 45 showing the in-work cross-sectional profile 464 measured by the profilometer 180. Also shown are the profile features 400 of the in-work cross-sectional profile 464 including the notch width 426 and notch depth 422 of the notches 420. The control system 200 may compare the profile features 400 with corresponding profile features 400 of a reference article 470 (not shown) to determine whether the adjustment of one or more bead forming parameters 240 is necessary in order to reduce or prevent nonconformities 430 in the in-work article 460. For example, the control system 200 may determine if adjustment of the head path is required to maintain the side of the new bead 324 in alignment with the surface of the tool 124 indicated in FIG. 46.

As described above, in some examples, the control system 200 may use machine-learned profile data 490 as the reference profile data 472 for comparison to the in-work profile data 462. As noted above, the machine-learned profile data 490 includes a plurality of in-work cross-sectional profiles 464 previously-generated at a corresponding plurality of in-work profile locations 466 in the in-work article 460. In addition to comparing the machine-learned profile data 490 to the in-work profile data 462 for determining whether adjustment of the bead forming parameters 240 is necessary, the control system 200 may also continuously compare the in-work cross-sectional profiles 464 previously generated as a means to detect, via machine learning, a trend in the operating characteristics of the printhead 140. Such operating characteristics may be predictive of the manufacturing system 100 operating out of specification at some point in the future. Trends in the operating characteristics of the manufacturing system 100 may provide an early indication of a need for adjustment, maintenance, repair, and/or replacement of one or more components of the manufacturing system 100.

For example, continuous comparison of in-work cross-sectional profiles 464 may result in the control system 200 identifying a trend of a change in the bead diameter at which pre-flattened beads 320 are extruded from the nozzle 150. The control system 200 may identify a trend of gradually increasing bead diameter which may be representative of wear of the nozzle 150 and/or sub-nominal operation of the pump (not shown) feeding material through the nozzle 150. Another trend may be a trend of a gradually increasing bead height 404 of the new bead 324 which may be an indication of the compression device 160 being out of adjustment. A further trend may be a trend of reduced accuracy with which the printhead 140 locates the pre-flattened bead 320 on the substrate 120, and which may be representative of out-of-specification performance of the head moving system 104 (e.g., a gantry 106—FIG. 1; robotic device—not shown). As may be appreciated, the control system 200 may identify trends in any one of a variety of different operating characteristics of the printhead 140 as a result of continuous comparison of the in-work cross-sectional profiles 464 during manufacturing of an in-work article 460. Upon identifying a trend that may result in one or more nonconformities 430, the control system 200 may be configured to issue an alert (e.g., visual, aural, tactile) indicating that the manufacturing system 100 may currently be operating out of specification, or that the manufacturing system 100 may potentially operate out of specification unless corrective action is taken.

Figure 47:
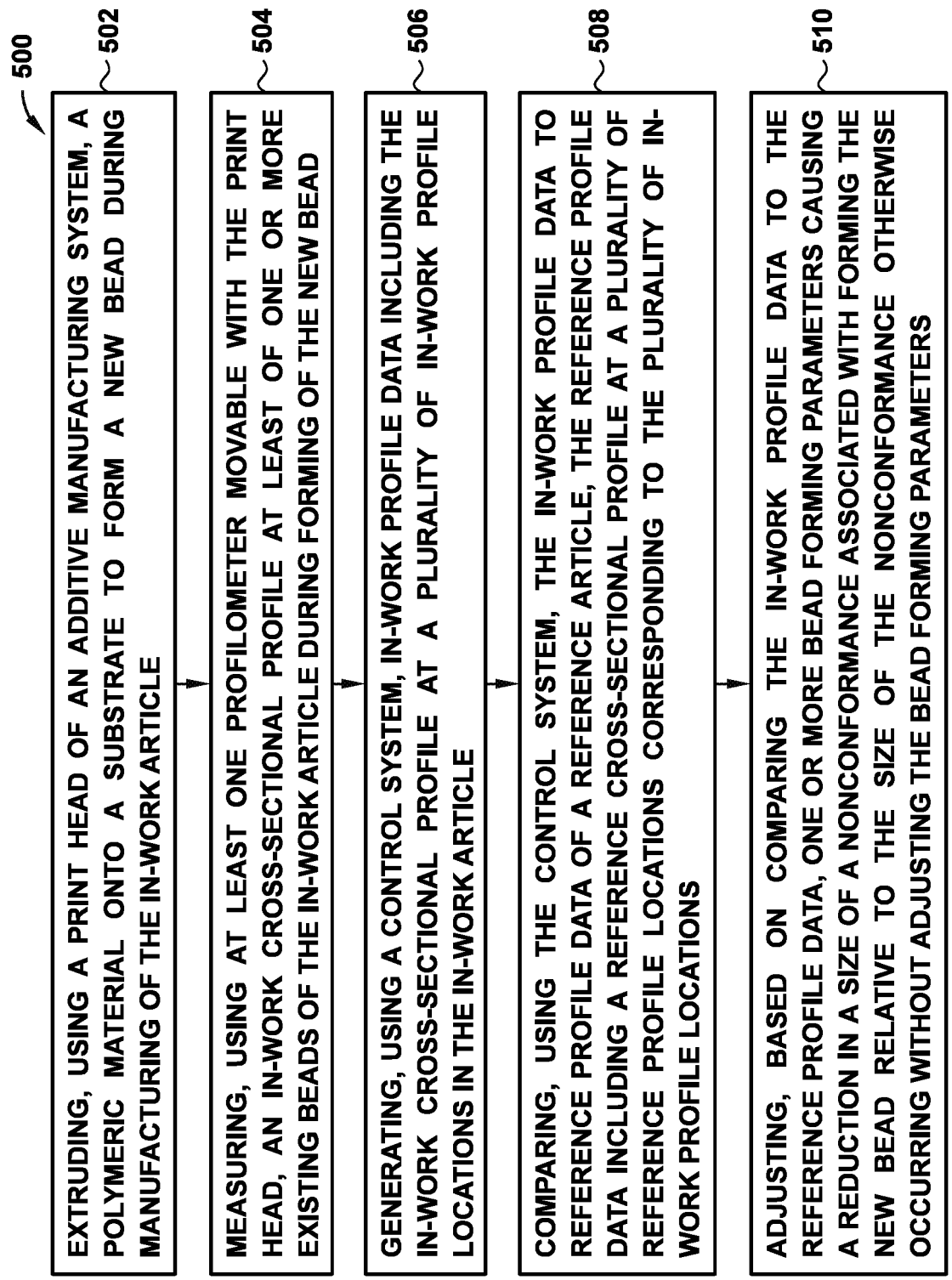
FIG. 47 is a flowchart of operations included in a method of additively manufacturing an article.

Referring to FIG. 47, shown is a flowchart of operations included in a method 500 of additively manufacturing an in-work article 460. The method 500 includes step 502 of extruding, using a printhead 140 of an additive manufacturing system 100, a material onto a substrate 120 to form a new bead 324 during manufacturing of the in-work article 460. In the context of the present disclosure and as shown in the figures and described above, step 502 of extruding the material onto the substrate 120 may comprise extruding material (e.g., molten material) from a nozzle 150 as a pre-flattened bead 320 of generally circular cross-section.

Step 502 may additionally include compressing, using a compression device 160 (e.g., a compression roller 162) coupled to the printhead 140, the pre-flattened bead 320 against the substrate 120 to form the new bead 324 as a flattened bead 322. As described above, the printhead 140 may extrude molten material of any one of a variety of compositions including, but not limited to, glass material, ceramic material, metallic material, polymeric material, or any combination thereof. However, in an alternative example mentioned above, the printhead 140 may be configured to dispense metallic wire feedstock (e.g., a continuous metal wire—not shown) which may be continuously melted onto a substrate 120 as the wire feedstock is dispensed. The wire feedstock may be melted using a localized high-temperature source (not shown) such as a resistance heating element, an arc-welding torch, a laser, and/or an electron beam to form a new bead 324 of cooled metallic material on the substrate 120 as the printhead 140 moves along the substrate 120. Although not shown, the printhead 140 may include a device for imparting a desired cross-sectional shape to the molten metallic material prior to cooling and solidifying into the new bead 324.

The method 500 additionally includes step 504 of measuring, using at least one profilometer 180 movable with the printhead 140, an in-work cross-sectional profile 464 at least of one or more existing beads 340 of the in-work article 460 during forming of the new bead 324. As described above, the printhead 140 may include one or more profilometers 180 configured for non-contact measurement of the surface contour of the existing beads 340. Depending upon the location of the profilometer 180 relative to the printhead 140, an in-work cross-sectional profile 464 may additionally measure the surface contour of a pre-flattened bead 320 or a new bead 324 being formed relative to the existing beads 340. In this regard, step 504 of measuring the in-work cross-sectional profile 464 using the at least one profilometer 180 may include measuring the in-work cross-sectional profile 464 at a pre-laydown location 300 upstream of the nozzle 150 as shown in the example of FIG. 4, and which may result in an in-work cross-sectional profile 464 of only existing beads 340 similar to the example shown in FIGS. 8-9. Alternatively or additionally, step 504 may include measuring the in-work cross-sectional profile 464 at a pre-flattened location 304 between the nozzle 150 and a compression device 160 as shown in FIG. 4, and which may result in an in-work cross-sectional profile 464 of the pre-flattened beads 320 and the existing beads 340 similar to the example shown in FIGS. 11-12. Step 504 may alternatively or additionally include measuring the in-work cross-sectional profile 464 at a post-flattened location 306 downstream of the compression device 160 as shown in FIG. 4, and which may result in an in-work cross-sectional profile 464 of the new bead 324 and the existing beads 340 similar to the example shown in FIGS. 15-14.

In some examples, step 504 of measuring the in-work cross-sectional profile 464 may be performed by scanning, using a laser profilometer, a laser beam at least along a lateral direction 184 (FIG. 3) perpendicular to a direction of travel of the printhead 140 during forming of the new bead 324. Alternatively or additionally, the printhead 140 may include one or more laser profilometers configured to scan a laser beam along a longitudinal direction 188 (FIG. 3) which is parallel to the direction of travel of the printhead 140. In still further examples, the printhead 140 may include one or more laser profilometers configured to scan in any one a variety of directions including in a combination of the lateral direction 184 and the longitudinal direction 188.

Referring still to FIG. 47, the method 500 additionally includes step 506 of generating, using a control system 200, in-work profile data 462 including the in-work cross-sectional profile 464 measured by the one or more profilometers 180 at a plurality of in-work profile locations 466 of the in-work article 460 as the printhead 140 moves along the head path. As mentioned above, the one or more one or more profilometers may continuously or periodically scan the surface contour of at least one or more existing beads 340 during manufacturing of the in-work article 460. The control system 200 may continuously or periodically receive and record the in-work cross-sectional profiles 464 measured by the one or more profilometers. The in-work profile locations 466 of the in-work cross-sectional profiles 464 may be automatically recorded by the control system 200. The in-work profile locations 466 may be based on six-dimensional locational data (e.g., three-dimensional position data and three-dimensional angular orientation data) of the printhead 140 at the time of measurement of the in-work cross-sectional profiles 464. For example, as mentioned above, the six-dimensional locational data of the printhead 140 may be derived from signals generated by one or more position control devices such as encoders (not shown) that may be included with the head moving system 104 of the additive manufacturing machine 102.

Referring to FIG. 47, the method 500 additionally includes step 508 of comparing, using the control system 200, the in-work profile data 462 to reference profile data 472 of a reference article 470. As described above, the reference profile data 472 includes the reference cross-sectional profile 474 at a plurality of reference profile locations 476 that correspond to the plurality of in-work profile locations 466 of the in-work article 460 being manufactured. Step 508 of comparing the in-work profile data 462 to the reference profile data 472 may include comparing one or more profile features 400 of an in-work cross-sectional profile 464 with one or more corresponding profile features 400 of a corresponding reference cross-sectional profile 474. For example, the method may include comparing a bead lateral location 402, a bead shape, a bead size, a notch size, and/or a notch shape of the in-work cross-sectional profiles 464 respectively to the bead lateral location 402, bead shape, bead size, notch size, and/or notch shape of the corresponding reference cross-sectional profile 474 of the reference article 470.

As described above, the bead lateral location 402 may be measured relative to the bead centerlines 360 of existing beads 340, the pre-flattened bead 320, and/or the new bead 324. The bead size may include the bead width 406 and/or the bead height 404 of existing beads 340, the pre-flattened bead 320, and/or the new bead 324. The bead shape may define the cross-sectional shape of an existing bead 340 or a new bead 324 as a rectangular shape, a square shape or other shapes. The bead shape may also define the radius of curvature of the bead corners (e.g., of the bead-cross-sectional shape) or other geometric features of the bead-cross-sectional shape. The notch size of a notch 420 between existing beads 340 may include the notch depth 422 at the notch apex 424, the notch width 426, and/or the notch cross-sectional area. The notch shape may include the radius of curvature of the sides of the notch 420 between existing beads 340, and/or the notch shape may include other geometric characteristics of the notch 420.

In some examples, the reference profile data 472 may be nominal profile data 482. In one example described above, the reference profile data 472 may be generated from a reference article 470 which may be an in-work article 460 that has been completed and designated as a nominal article 480 for use as a reference standard against which future in-work articles 460 may be compared during manufacturing of manufacturing of in-work articles 460. The method may optionally include evaluating a physical example of a nominal article 480 (e.g., an in-work article 460 previously manufactured) that is representative of the in-work article 460. The method may include generating reference profile data 472 by measuring a nominal cross-sectional profile 484 at a plurality of nominal profile locations 486 in the nominal article 480 representative of at least a portion of the in-work article 460. The method may then include generating profile-to-void data 488 identifying voids 442 existing at or associated with one or more of the nominal profile locations 486 (FIG. 2) in the reference article 470. The method may additionally include generating the nominal profile data 482 containing the nominal cross-sectional profile 484 and the profile-to-void data 488 at one or more of the nominal profile locations 486, as described above.

As an alternative to or in addition to generating reference profile data 472 from a nominal article 480, the method may include generating simulated profile data 494 as the reference profile data 472. Simulated profile data 494 may be generated by analyzing a simulated cross-sectional profile 496 at a plurality of simulated profile locations 498 of a simulated article 492 which may be a computer model of the in-work article 460. For example, as mentioned above, the computer model may be a CAD model 222 of the in-work article 460 and may represent an as-designed version of the in-work article 460. Analysis of the simulated cross-sectional profile 496 at a plurality of simulated profile locations 498 may include extracting measurements of profile features 400 (e.g., bead size, bead shape, notch size, notch shape) from the simulated cross-sectional profile 496 at a plurality of simulated profile locations 498 in the simulated article 492. The method may further include generating profile-to-void data 488 identifying voids 442 in the simulated article 492 as may exist at the simulated profile locations 498. The method may also include generating and storing in the memory 202 the simulated profile data 494 containing the simulated cross-sectional profile 496 and the profile-to-void data 488 at one or more of the simulated profile locations 498.

As another alternative to or in addition to generating reference profile data 472 from a nominal article 480 or from a simulated article 492, the method may include generating machine-learned profile data 490 for use as the reference profile data 472. For generating machine-learned profile data 490, the method may include continuously comparing in-work cross-sectional profiles 464 measured at a plurality of in-work profile locations 466 during manufacturing of an in-work article 460. The method may additionally include identifying, based on continuously comparing the in-work cross-sectional profiles 464, one or more patterns of nonconformities 430 associated with the existing beads 340 of the in-work article 460. For example, as mentioned above, the method may include identifying a pattern of bead mislocation 434 of one or more existing beads 340 at one or more types of locations in the in-work article 460, such as at certain types of corners (e.g., directional changes of the existing beads), or at other locations in the in-work article 460. In another example, the method may include identifying a pattern of gaps 432 occurring at certain types of locations in the in-work article 460. The method may include generating machine-learned profile data 490 containing the nominal cross-sectional profile 484 and one or more patterns of nonconformities 430 at one or more of the in-work profile locations 466 of the nominal cross-sectional profiles 484.

Regardless of the source of the reference profile data 472, the method 500 additionally includes step 510 of adjusting, based on comparing the in-work profile data 462 to the reference profile data 472, one or more bead forming parameters 240 causing a reduction in a size of a nonconformity 430 associated with forming the new bead 324 relative to the size of the nonconformity 430 that would otherwise occur if the bead forming parameters 240 were not adjusted. Step 510 of adjusting one or more bead forming parameters 240 may include forming the new bead 324 in a manner causing a reduction in a size of a gap 432 between the new bead 324 and one or more of the existing beads 340, relative to the size of the gap 432 that would occur without adjusting the bead forming parameters 240. Alternatively or additionally, the bead forming parameters 240 may be adjusted in a manner to reduce the magnitude of a bead mislocation 434 of a new bead 324 relative to one or more of the existing beads 340, or reducing the size of a void 442 occurring as a result of a surface cavity 436 in an existing bead 340. In any of the above-described examples, the adjustment of one or more bead forming parameters 240 may result in a reduction of the size of voids 442 that would otherwise exist in the in-work article 460 when completed relative to the size of the voids 442 that would occur without adjusting the bead forming parameters 240.

Step 510 of adjusting one or more bead forming parameters 240 may include adjusting one or more path parameters 242 and/or one or more process parameters 244 of the printhead 140. For example, adjustment of the path parameters 242 may include adjustment of the head path defining the directions of movement and orientation of the printhead 140, and/or adjustment of the head travel speed of the printhead 140. Adjustment of the process parameters 244 may include adjustment of the material temperature at which the material is extruded onto the substrate 120, adjustment of the material feed rate at which material is extruded onto the substrate 120, and/or adjustment of the bead lay rate at which the new bead 324 is formed. Adjustment of the process parameters 244 may additionally or alternatively include adjustment of the temperature of the compression device 160 as a means for increasing or decreasing the temperature of the material during flattening of the pre-flattened bead 320 by the compression device 160. Adjustment of the process parameters 244 may also optionally include adjustment of the vertical position of the compression device 160 as a means for controlling the bead height 404 of the new bead 324 to be consistent with the bead height 404 of existing beads 340. In addition, adjustment of the process parameters 244 may include adjustment of the compaction pressure applied by the compression device 160 onto the material against the substrate 120, which may affect the bead size and/or bead shape of the new bead 324.

As an example of adjusting one or more bead forming parameters 240, step 510 of the method may include adjusting the lateral position of the printhead 140 in a manner causing the new bead 324 to be positioned nearer to an existing bead 340 as a means to reduce or prevent the occurrence of a gap 432 between the new bead 324 and the existing bead 340, as illustrated in FIGS. 24-25. In another example of adjusting one or more bead parameters, step 510 of the method may include adjusting the head travel speed and/or the material feed rate in a manner causing a change in size of the new bead 324 as a means for reducing or preventing the occurrence of a gap 432 between the new bead 324 and an existing bead 340, as illustrated in FIGS. 28-29.

As described above, the method may optionally include the use of machine learning in which the comparison of the in-work profile data 462 to reference profile data 472 can be used to measure performance trends of the additive manufacturing machine 102 to determine or predict out-of-specification performance of the manufacturing system 100. In this regard, the method may include continuously comparing the in-work cross-sectional profiles 464 at a corresponding plurality of in-work profile locations 466 during manufacturing of the in-work article 460. As a result of continuously comparing the in-work profile data 462, the method may include detecting, via machine learning, a trend in operating characteristics of the manufacturing system 100. Such trends in operation may be predictive of the manufacturing system 100 operating out of specification either currently or in the future. Upon determining current or future of-of-specification operation of the manufacturing system 100, the control system 200 may be configured to issue an alert to appropriate personnel, as mentioned above.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A manufacturing system, comprising:
    a printhead having a nozzle configured to extrude a material onto a substrate and form a new bead during additive manufacturing of an in-work article;
    two profilometers, each movable with the printhead and configured to measure an in-work cross-sectional profile at least of one or more existing beads of the in-work article during forming of the new bead, the two profilometers are comprised of one of the following:
        the two profilometers comprise an upstream profilometer located upstream of the nozzle, and a downstream profilometer located downstream of the nozzle; or
        the two profilometers comprise a first downstream profilometer located between the nozzle and a compression device of the printhead, and a second downstream profilometer located downstream of the compression device;
    a control system configured to generate in-work profile data including the in-work cross-sectional profile respectively generated by each of the two profilometers at a plurality of in-work profile locations in the in-work article, and continuously perform a profile comparison of the in-work profile data to reference profile data of a reference article, the reference profile data including a reference cross-sectional profile at a plurality of reference profile locations corresponding to the plurality of in-work profile locations; and
    the control system configured to adjust, based on the profile comparison, one or more bead forming parameters and cause the printhead to form the new bead according to the bead forming parameters in a manner resulting in a reduction in a size of a nonconformity associated with forming the new bead relative to the size of the nonconformity otherwise occurring without adjusting the bead forming parameters.

2. The manufacturing system of claim 1, wherein the control system is configured to perform the profile comparison by comparing at least one of the following profile features of the in-work cross-sectional profile generated by at least one of the two profilometers to a corresponding one of the profile features of the reference cross-sectional profile:
    at least one of a bead lateral location, a bead shape, and a bead size of one or more beads in at least one of a new layer and a beneath layer located directly below the new layer in which the new bead is to be formed; and
    at least one of a notch size and a notch shape of a notch between beads.

3. The manufacturing system of claim 1, wherein the nonconformity comprises at least one of the following:
    a gap between the new bead and one or more of the existing beads;
    a bead mislocation of the new bead relative to one or more of the existing beads;
    a surface cavity in an existing bead; and
    a void in the in-work article.

4. The manufacturing system of claim 1, wherein the bead forming parameters include at least one of the following:
    a path parameter including at least one of:
        a head path defining directions of movement and orientations of the printhead;
        a head travel speed of the printhead relative to the substrate;
    a process parameter including at least one of:
        a material temperature at which the material is extruded onto the substrate;
        a material feed rate at which material is extruded onto the substrate
        a bead lay rate at which the new bead is formed;
        a temperature of a compression device of the printhead;
        a vertical position of the compression device; and
    a compaction pressure applied by the compression device onto the material against the substrate.

5. The manufacturing system of claim 1, wherein:
the nozzle configured to extrude a pre-flattened bead of material onto the substrate; and
the compression device is configured to compress the pre-flattened bead against the substrate and form the new bead as a flattened bead.

6. The manufacturing system of claim 1, wherein the downstream profilometer located downstream of the nozzle, is positioned at one of the following locations:
between the nozzle and the compression device; or
downstream of the compression device.

7. The manufacturing system of claim 1, wherein:
at least one of the two profilometers is a laser profilometer configured to scan at least along a lateral direction perpendicular to a direction of travel of the printhead during forming of the new bead.

8. The manufacturing system of claim 1, wherein:
the reference profile data comprises nominal profile data of a nominal article, the nominal profile data including a plurality of nominal cross-sectional profiles at a corresponding plurality of nominal profile locations and including profile-to-void data identifying voids in the nominal article at one or more of the nominal profile locations;
the nominal cross-sectional profile generated from evaluation of a physical example of the nominal article prior to manufacturing the in-work article; and
the control system configured to adjust, based on the profile comparison, one or more bead forming parameters in a manner reducing a nonconformity to a size no larger than the nonconformity at a corresponding one or more of the nominal profile locations in the nominal article.

9. The manufacturing system of claim 1, wherein:
the reference profile data comprises simulated profile data of a simulated article, the simulated profile data including a plurality of simulated cross-sectional profiles at a corresponding plurality of simulated profile locations and including profile-to-void data identifying voids in the simulated article at one or more of the simulated profile locations;
the simulated cross-sectional profile generated from a computer model of the in-work article; and
the control system configured to adjust, based on the profile comparison, one or more bead forming parameters in a manner reducing a nonconformity to a size no larger than the nonconformity at a corresponding one or more of the simulated profile locations in the simulated article.

10. A method of manufacturing an in-work article, comprising:
extruding, using a nozzle of a printhead of an additive manufacturing system, a material onto a substrate to form a new bead during manufacturing of the in-work article;
measuring, using two profilometers, each movable with the printhead, an in-work cross-sectional profile at least of one or more existing beads of the in-work article during forming of the new bead, the two profilometers are comprised of one of the following:
the two profilometers comprise an upstream profilometer located upstream of the nozzle, and a downstream profilometer located downstream of the nozzle; or
the two profilometers comprise a first downstream profilometer located between the nozzle and a compression device of the printhead, and a second downstream profilometer located downstream of the compression device;
generating, using a control system, in-work profile data including the in-work cross-sectional profile respectively generated by each of the two profilometers at a plurality of in-work profile locations in the in-work article;
comparing, using the control system, the in-work profile data to reference profile data of a reference article, the reference profile data including a reference cross-sectional profile at a plurality of reference profile locations corresponding to the plurality of in-work profile locations; and
adjusting, based on comparing the in-work profile data to the reference profile data, one or more bead forming parameters causing a reduction in a size of a nonconformity associated with forming the new bead relative to the size of the nonconformity otherwise occurring without adjusting the bead forming parameters.

11. The method of claim 10, wherein comparing the in-work profile data to the reference profile data comprises:
comparing at least one of a bead lateral location, a bead shape, a bead size, a notch size, and a notch shape of the in-work cross-sectional profile generated by at least one of the two profilometers to a corresponding one of the bead lateral location, the bead shape, the bead size, the notch size, and the notch shape of the reference cross-sectional profile.

12. The method of claim 10, wherein adjusting one or more bead forming parameters includes forming the new bead in a manner causing a reduction in a size of at least one of the following nonconformities:
a gap between the new bead and one or more of the existing beads;
a bead mislocation of the new bead relative to one or more of the existing beads;
a surface cavity in an existing bead; and
a void in the in-work article when completed.

13. The method of claim 10, wherein adjusting one or more bead forming parameters includes adjusting at least one of the following:
a path parameter including at least one of:
a head path defining directions of movement and orientations of the printhead;
a head travel speed of the printhead relative to the substrate;
a process parameter including at least one of:
a material temperature at which the material is extruded onto the substrate;
a material feed rate at which material is extruded onto the substrate
a bead lay rate at which the new bead is formed;
a temperature of a compression device of the printhead;
a vertical position of the compression device; and
a compaction pressure applied by the compression device onto the material against the substrate.

14. The method of claim 13, wherein adjusting one or more bead forming parameters includes:
laterally repositioning the printhead in a manner causing the new bead to be positioned nearer to an existing bead to reduce or prevent the occurrence of a gap between the new bead and the existing bead.

15. The method of claim 13, wherein adjusting one or more bead forming parameters includes:
adjusting at least one of the head travel speed and the material feed rate in a manner causing a change in a size of the new bead for reducing or preventing the occurrence of a gap between the new bead and the existing bead.

16. The method of claim 10, wherein the printhead includes the compression device for compressing a pre-flattened bead extruded by the nozzle, the step of measuring the in-work cross-sectional profile using the two profilometers comprising:
- measuring the in-work cross-sectional profile using the upstream profilometer located upstream of the nozzle, and the downstream profilometer located downstream of the nozzle at one of the following locations:
  - at a pre-flattened location between the nozzle and the compression device; or
  - at a post-flattened location downstream of the compression device.

17. The method of claim 10, wherein measuring the in-work cross-sectional profile using the two profilometers comprises:
- scanning, using a laser profilometer, at least along a lateral direction perpendicular to a direction of travel of the printhead during forming of the new bead.

18. The method of claim 10, further comprising generating nominal profile data as the reference profile data by performing the following:
- measuring a nominal cross-sectional profile at a plurality of nominal profile locations in a physical example of a nominal article representative of at least a portion of the in-work article; and
- generating profile-to-void data identifying voids in the nominal article at one or more of the nominal profile locations; and
- generating the nominal profile data containing the nominal cross-sectional profile and the profile-to-void data at one or more of the nominal profile locations.

19. The method of claim 10, further comprising generating simulated profile data as the reference profile data by performing the following:
- analyzing a simulated cross-sectional profile at a plurality of simulated profile locations of a simulated article comprising a computer model of the in-work article;
- generating profile-to-void data identifying voids in the simulated article at one or more of the simulated profile locations; and
- generating the simulated profile data containing the simulated cross-sectional profile and the profile-to-void data at one or more of the simulated profile locations.

20. The method of claim 10, further comprising generating machine-learned profile data as the reference profile data by performing the following:
- continuously comparing the in-work cross-sectional profiles at a corresponding plurality of in-work profile locations during manufacturing of the in-work article;
- identifying, via machine learning based continuously comparing the in-work cross-sectional profiles, one or more patterns of nonconformities associated with the existing beads of the in-work article; and
- generating the machine-learned profile data containing the nominal cross-sectional profile and the one or more patterns of nonconformities at one or more of the in-work profile locations.

21. The method of claim 10, further comprising:
- continuously comparing the in-work cross-sectional profiles at a corresponding plurality of in-work profile locations during manufacturing of the in-work article; and
- detecting, via machine learning, a trend in operating characteristics predictive of the manufacturing system operating out of specification.

22. A method of manufacturing an in-work article, comprising:
- evaluating a physical example of a nominal article representative of at least a portion of the in-work article;
- generating nominal profile data containing a nominal cross-sectional profile and associated voids at one or more of a plurality of nominal profile locations in the nominal article;
- extruding, using a nozzle of a printhead of an additive manufacturing system, a polymeric material onto a substrate to form a new bead during manufacturing of the in-work article;
- measuring, using two profilometers, each movable with the printhead, an in-work cross-sectional profile at least of one or more existing beads of the in-work article during forming of the new bead, the two profilometers are comprised of one of the following:
  - the two profilometers comprise an upstream profilometer located upstream of the nozzle, and a downstream profilometer located downstream of the nozzle; or
  - the two profilometers comprise a first downstream profilometer located between the nozzle and a compression device of the printhead, and a second downstream profilometer located downstream of the compression device;
- generating, using a control system, in-work profile data including the in-work cross-sectional profile respectively generated by each of the two profilometers at a plurality of in-work profile locations in the in-work article;
- comparing, using the control system, the in-work profile data to the nominal profile data; and
- adjusting, based on comparing the in-work profile data to the nominal profile data, one or more bead forming parameters causing a reduction in a size of a nonconformity associated with forming the new bead relative to the size of the nonconformity otherwise occurring without adjusting the bead forming parameters.

* * * * *